(12) United States Patent
Xin

(10) Patent No.: US 12,010,396 B2
(45) Date of Patent: Jun. 11, 2024

(54) MODE CONFIGURATION METHOD AND MODE CONFIGURATION APPARATUS

(71) Applicant: Honor Device Co., Ltd., Shenzhen (CN)

(72) Inventor: Jingjing Xin, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/245,308

(22) PCT Filed: May 10, 2022

(86) PCT No.: PCT/CN2022/091985
§ 371 (c)(1),
(2) Date: Mar. 14, 2023

(87) PCT Pub. No.: WO2023/284389
PCT Pub. Date: Jan. 19, 2023

(65) Prior Publication Data
US 2023/0362454 A1    Nov. 9, 2023

(30) Foreign Application Priority Data
Jul. 15, 2021    (CN) .......................... 202110803251.3

(51) Int. Cl.
*H04N 21/6547*    (2011.01)
*H04N 21/4223*    (2011.01)
*H04N 21/4415*    (2011.01)
*H04N 21/485*    (2011.01)

(52) U.S. Cl.
CPC ..... *H04N 21/6547* (2013.01); *H04N 21/4223* (2013.01); *H04N 21/4415* (2013.01); *H04N 21/485* (2013.01)

(58) Field of Classification Search
CPC .......... H04N 21/6547; H04N 21/4223; H04N 21/4415; H04N 21/485; H04N 21/44218; H04N 21/4532; G06F 16/9535; G06F 16/735
See application file for complete search history.

(56) References Cited

U.S. PATENT DOCUMENTS

2011/0069940 A1\*  3/2011  Shimy .............. H04N 21/4532
386/296
2011/0244829 A1\*  10/2011  Kase .................... H04N 1/442
455/411
2015/0019995 A1\*  1/2015  Song .................... H04N 21/47
715/750

\* cited by examiner

*Primary Examiner* — Kunal Langhnoja
(74) *Attorney, Agent, or Firm* — Slater Matsil, LLP

(57) ABSTRACT

This application provides a mode configuration method and a mode configuration system, The system includes: a first terminal device, a second terminal device and a server. The first terminal device is a large screen display. A user can perform personalized settings of first terminal device the by using the second terminal device. The second terminal device is different from the first terminal device, and is generally a device that is convenient for the user to carry and operate and can provide the user with a diversity of options for personalized setting.

13 Claims, 12 Drawing Sheets

MODE CONFIGURATION METHOD AND MODE CONFIGURATION APPARATUS

CROSS-REFERENCE TO RELATED APPLICATIONS

This application is a national stage of International Application No. PCT/CN2022/091985 filed on May 10, 2022, which claims priority to Chinese Patent Application No. 202110803251.3 filed on Jul. 15, 2021. The disclosures of both of the aforementioned application are hereby incorporated by reference in their entireties.

TECHNICAL FIELD

This application relates to the field of intelligent terminals, and more specifically, to a mode configuration method and a mode configuration apparatus.

BACKGROUND

In a scenario in which many family members are watching a presentation on a large screen display together, each person may have a different watch preference. For example, the elderly usually like to watch a presentation on the large screen display through a set-top box or a network set-top box connected to the Internet for playing online videos (over the top, OTT), while the young like to watch a presentation on the large screen display by using various video software. For example, children like to watch cartoons, while adults like to watch drama series. For another example, some users like to turn up the volume for the large screen display when watching a video, while some users like to turn down the volume for the large screen display when watching a video.

At present, regardless of switching a signal source of the large screen display, switching watch categories that different users like, or adjusting the volume for the large screen display, a remote control is generally used. However, the remote control requires tedious settings and cannot remember user watch preferences, which is not user-friendly.

SUMMARY

This application provides a mode configuration method and a mode configuration apparatus, which allow performing personalized settings based on user watch preferences and automatically switching or adapting to a watch mode of a user, helping improve user watch experience and user viscosity.

According to a first aspect, a mode configuration method is provided, applied to an intelligent system including a first terminal device and a server, where the first terminal device is equipped with a camera, and the method includes: obtaining, by a first terminal device, face information of a first user by using a camera, and sending the face information of the first user to the server; receiving, by the server, the face information of the first user, and obtaining, based on the face information of the first user, mode information of the first user from mode information of a plurality of users, where the mode information includes personalized settings information and video resource recommendation information; sending, by the server, the mode information of the first user to the first terminal device; and receiving, by the first terminal device, the mode information of the first user, and configuring, for the first user, video resources corresponding to the mode information.

In this embodiment of this application, the camera of the first terminal device may perform face recognition on the first user, and after the recognition, the first terminal device may obtain personalized settings information corresponding to the face information of the first user from the server. In this way, the first terminal device may configure video resources corresponding to the personalized settings information and video resource recommendation information for the user. Face recognition technology can be used to accurately identify different users, improving recognition accuracy. Personalized video recommendation helps improve user experience and user viscosity.

With reference to the first aspect, in some implementations of the first aspect, the personalized settings information includes at least one of signal source, volume, watch mode, watch category, watch duration, brightness, or sound effect.

With reference to the first aspect, in some implementations of the first aspect, the configuring, by the first terminal device for the first user, video resources corresponding to the mode information includes: displaying, by the first terminal device, a page corresponding to the signal source specified for the first user, where the page includes video resources that are presented in a form of cards and correspond to the watch category specified for the first user and video resources recommended by the server.

In this embodiment of this application, the first terminal device can present to the user the video resources that are in a form of cards and correspond to the watch category specified for the first user and the video resources recommended by the server. Such a visual form helps improve user experience.

With reference to the first aspect, in some implementations of the first aspect, the first terminal device displays a first face registration screen in response to an operation of creating an account by the first user, where the first face registration screen includes a first selection window and a second selection window, the first selection window is used for agreeing to register face information, and the second selection window is used for refusing to register face information. The first terminal device obtains, by using the camera, the face information of the first user in response to an operation of agreeing to register face information by the first user.

In this embodiment of this application, the user can select to agree or refuse to register face information during account creation, which shows respect for user privacy.

With reference to the first aspect, in some implementations of the first aspect, after the first terminal device obtains, by using the camera, the face information of the first user in response to an operation of agreeing to register face information by the first user, the method further includes: displaying, by the first terminal device, a first basic settings screen, so that the first user performs personalized settings on the first basic settings screen to generate personalized settings information of the first user; sending, by the first terminal device, the face information of the first user and the personalized settings information of the first user to the server; and receiving and storing, by the server, the face information of the first user and the personalized settings information of the first user.

In this embodiment of this application, the user can perform personalized settings on the first basic settings screen of the first terminal device, and after the settings are completed, the first terminal device can store the face information and personalized information of the first user in the server, facilitating user data management.

With reference to the first aspect, in some implementations of the first aspect, the camera is built into the first terminal device.

With reference to the first aspect, in some implementations of the first aspect, the camera is connected to the first terminal device by a connection cable.

With reference to the first aspect, in some implementations of the first aspect, the intelligent system further includes a second terminal device, the second terminal device is equipped with a camera, and the method further includes: displaying, by the second terminal device, a second face registration screen in response to an operation of creating an account by the first user, where the second face registration screen includes a third selection window and a fourth selection window, the third selection window is used for agreeing to register face information, and the fourth selection window is used for refusing to register face information; and obtaining, by the second terminal device by using the camera of the second terminal device, the face information of the first user in response to an operation of agreeing to register face information by the first user.

In this embodiment of this application, the user can also perform personalized settings by using a second terminal device. The second terminal device is different from the first terminal device, and is generally a device that is convenient for the user to carry and operate and can provide the user with a diversity of options for personalized setting.

With reference to the first aspect, in some implementations of the first aspect, after the second terminal device obtains, by using the camera of the second terminal device, the face information of the first user in response to an operation of agreeing to register face information by the first user, the method further includes: displaying, by the second terminal device, a second basic settings screen, so that the first user performs personalized settings on the second basic settings screen to generate personalized settings information of the first user; sending, by the second terminal device, the face information of the first user and the personalized settings information of the first user to the server; and receiving and storing, by the server, the face information of the first user and the personalized settings information of the first user.

With reference to the first aspect, in some implementations of the first aspect, the server receives and stores a watch history of the first user. The server determines, based on the watch history of the first user, the video resource recommendation information and recommendation time period information of the first user.

With reference to the first aspect, in some implementations of the first aspect, the watch history includes at least one of the face information, watch category, or watch time period of the first user.

With reference to the first aspect, in some implementations of the first aspect, the server receives and stores watch histories of a plurality of users. The server classifies the watch histories of the plurality of users to determine the video resource recommendation information and recommendation time period information of the first user.

In this embodiment of this application, the server can determine, based on the watch histories of the plurality of users, the video resource recommendation information and recommendation time period information of the first user, so that a more intelligent service can be provided for the user through big data recommendation, improving user experience.

With reference to the first aspect, in some implementations of the first aspect, the classifying, by the server, the watch histories of the plurality of users to determine the video resource recommendation information and recommendation time period information of the first user includes: classifying, by the server on a basis of "age group"-"time period"-"watch category", the watch histories of the plurality of users to determine a plurality of categories; determining, by the server based on the face information of the first user, an age group to which the first user belongs; and determining, by the server based on the age group to which the first user belongs and the plurality of categories, the video resource recommendation information and the recommendation time period information of the first user.

With reference to the first aspect, in some implementations of the first aspect, the classifying, by the server, the watch histories of the plurality of users to determine the video resource recommendation information and recommendation time period information of the first user includes: classifying, by the server on a basis of "gender"-"time period"-"watch category", the watch histories of the plurality of users to determine a plurality of categories; determining, by the server based on the face information of the first user, a gender of the first user; and determining, by the server based on the gender of the first user and the plurality of categories, the video resource recommendation information and recommendation time period information of the first user.

According to a second aspect, a mode configuration method is provided, applied to an intelligent system including a first terminal device and a server, where the first terminal device is equipped with a camera, and the method includes: obtaining, by the first terminal device, face information of a first user by using the camera, and sending the face information of the first user to the server; and receiving, by the first terminal device, mode information of the first user, and configuring, for the first user, video resources corresponding to the mode information, where the mode information of the first user is obtained by the server from mode information of a plurality of users, and the mode information includes personalized settings information and video resource recommendation information.

According to a third aspect, a mode configuration method is provided, applied to an intelligent system including a first terminal device and a server, where the first terminal device is equipped with a camera, and the method includes: receiving, by the server, face information of a first user, and obtaining, by the server based on the face information of the first user, mode information of the first user from mode information of a plurality of users, where the mode information includes personalized settings information and video resource recommendation information, and the face information of the first user is obtained by the first terminal device by using the camera.

According to a fourth aspect, a mode configuration apparatus is provided, including: an obtaining module, configured to obtain face information of a first user; a sending module, configured to send the face information of the first user to a server; a receiving module, configured to receive mode information of the first user; and a processing module, configured to configure, for the first user, video resources corresponding to the mode information, where the mode information of the first user is obtained by the server from mode information of a plurality of users, and the mode information includes personalized settings information and video resource recommendation information.

With reference to the fourth aspect, in some implementations of the fourth aspect, the personalized settings information includes at least one of signal source, volume, watch mode, watch category, watch duration, brightness, or sound effect.

With reference to the fourth aspect, in some implementations of the fourth aspect, the processing module is configured to display a page corresponding to the signal source specified in the personalized settings information of the first user, where the page includes recommended video resources of the server and video resources that are presented in a form of cards and that correspond to the watch category specified for the first user.

With reference to the fourth aspect, in some implementations of the fourth aspect, the processing module is configured to display a first face registration screen in response to an operation of creating an account by the first user, where the first face registration screen includes a first selection window and a second selection window, the first selection window is used for agreeing to register face information, and the second selection window is used for refusing to register face information. The obtaining module is configured to obtain the face information of the first user in response to an operation of agreeing to register face information by the first user.

With reference to the fourth aspect, in some implementations of the fourth aspect, the processing module is configured to display a first basic settings screen, so that the first user performs personalized settings on the first basic settings screen to generate personalized settings information of the first user; and the sending module is configured to send the face information of the first user and the personalized settings information of the first user to the server.

With reference to the fourth aspect, in some implementations of the fourth aspect, the camera is built into the apparatus.

With reference to the fourth aspect, in some implementations of the fourth aspect, the camera is connected to the apparatus by a connection cable.

According to a fifth aspect, a mode configuration apparatus is provided, including: a receiving module, configured to receive face information of a first user; an obtaining module, configured to obtain, based on the face information of the first user, mode information of the first user from mode information of a plurality of users, where the mode information includes personalized settings information and video resource recommendation information; and a sending module, configured to send the mode information of the first user to a first terminal device.

With reference to the fifth aspect, in some implementations of the fifth aspect, the personalized settings information includes at least one of signal source, volume, watch mode, watch category, watch duration, brightness, or sound effect.

With reference to the fifth aspect, in some implementations of the fifth aspect, the receiving module is configured to receive the face information of the first user and the personalized settings information of the first user, where the face information of the first user and the personalized settings information of the first user are obtained through the first terminal device. The apparatus further includes a storage module, configured to store the face information of the first user and the personalized settings information of the first user.

With reference to the fifth aspect, in some implementations of the fifth aspect, the receiving module is configured to receive the face information of the first user and the personalized settings information of the first user, where the face information of the first user and the personalized settings information of the first user are obtained through the second terminal device. The apparatus further includes a storage module, configured to store the face information of the first user and the personalized settings information of the first user.

With reference to the fifth aspect, in some implementations of the fifth aspect, the receiving module is configured to receive a watch history of the first user. The storage module is configured to store the watch history of the first user. The apparatus further includes a processing module, configured to determine, based on the watch history of the first user, the video resource recommendation information and recommendation time period information of the first user.

With reference to the fifth aspect, in some implementations of the fifth aspect, the watch history includes at least one of the face information, watch category, or watch time period of the first user.

With reference to the fifth aspect, in some implementations of the fifth aspect, the receiving module is configured to receive watch histories of a plurality of users. The storage module is configured to store the watch histories of the plurality of users. The processing module is configured to classify the watch histories of the plurality of users to determine the video resource recommendation information and recommendation time period information of the first user.

With reference to the fifth aspect, in some implementations of the fifth aspect, the processing module is configured to: classify, on a basis of "age group"-"time period"-"watch category", the watch histories of the plurality of users to determine a plurality of categories; determine, based on the face information of the first user, an age group to which the first user belongs; and determine, based on the age group to which the first user belongs and the plurality of categories, the video resource recommendation information and the recommendation time period information of the first user.

With reference to the fifth aspect, in some implementations of the fifth aspect, the processing module is configured to: classify, on a basis of "gender"-"time period"-"watch category", the watch histories of the plurality of users to determine a plurality of categories; determine, based on the face information of the first user, a gender of the first user; and determine, based on the gender of the first user and the plurality of categories, the video resource recommendation information and recommendation time period information of the first user.

According to a sixth aspect, a mode configuration apparatus is provided, including: a processing module, configured to display a second face registration screen in response to an operation of creating an account by a first user, where the second face registration screen includes a third selection window and a fourth selection window, the third selection window is used for agreeing to register face information, and the fourth selection window is used for refusing to register face information; and an obtaining module, configured to obtain the face information of the first user in response to an operation of agreeing to register face information by the first user.

With reference to the sixth aspect, in some implementations of the sixth aspect, the processing module is configured to display a second basic settings screen, so that the first user performs personalized settings on the second basic settings screen to generate personalized settings information of the first user. The apparatus further includes a sending module, configured to send the face information of the first user and the personalized settings information of the first user to the server.

According to a seventh aspect, a mode configuration apparatus is provided, including a processor, where the processor is coupled to a memory, and may be configured to execute instructions stored in the memory to implement the method in any one possible implementation of any one of the foregoing aspects. Optionally, the apparatus further includes a memory. Optionally, the apparatus further includes a communications interface, and the processor is coupled to the communications interface.

In one implementation, the mode configuration apparatus is a first terminal device, a second terminal device, or a server. When the mode configuration apparatus is the first terminal device, the second terminal device, or the server, the communications interface may be a transceiver or an input/output interface.

In another implementation, the mode configuration apparatus is a chip configured in the first terminal device, the second terminal device, or the server. When the mode configuration apparatus is the chip configured in the first terminal device, the second terminal device, or the server, the communications interface may be an input/output interface.

According to an eighth aspect, a processor is provided, including: an input circuit, an output circuit, and a processing circuit. The processing circuit is configured to receive signals through the input circuit and transmit signals through the output circuit, so that the processor performs the method in any one possible implementation of any one of the foregoing aspects.

In a specific implementation process, the foregoing processor may be a chip, the input circuit may be an input pin, the output circuit may be an output pin, and the processing circuit may be a transistor, a gate circuit, a flip-flop, various logic circuits, or the like. The input signals received by the input circuit may be received and input by, for example but not limited to, a receiver, and the signals output by the output circuit may be, for example but not limited to, output to a transmitter and transmitted by the transmitter, and the input circuit and the output circuit may be a same circuit, where the circuit is used as the input circuit or the output circuit at different times. Specific implementations of the processor and various circuits are not limited in this embodiment of this application.

According to a ninth aspect, a processing apparatus is provided, including a processor and a memory. The processor is configured to read instructions stored in the memory, and may receive signals through a receiver and transmit signals through a transmitter, to perform the method in any one of the possible implementations of the foregoing first aspect.

Optionally, there are one or more processors and one or more memories.

Optionally, the memory may be integrated with the processor, or the memory and the processor may be disposed separately.

In a specific implementation process, the memory may be a non-transitory (non-transitory) memory, such as a read-only memory (read only memory, ROM), which may be integrated with the processor on a same chip, or may be disposed in a different chip. A type of the memory and a manner of disposing the memory and the processor are not limited in this embodiment of this application.

It should be understood that for a related data interaction process, for example, sending indication information may be a process of outputting indication information from the processor, and receiving capability information may be a process of receiving input capability information by the processor. Specifically, data output by the processor may be output to the transmitter, and input data received by the processor may come from the receiver. The transmitter and the receiver may be collectively referred to as a transceiver.

The processing apparatus in the ninth aspect may be a chip, and the processor may be implemented by using hardware or software. When implemented by using hardware, the processor may be a logic circuit, an integrated circuit, or the like. When implemented by using software, the processor may be a general-purpose processor, and is implemented by reading software code stored in the memory. The memory may be integrated into the processor, or may exist separately outside the processor.

According to a tenth aspect, an intelligent system is provided, including the apparatuses according to the fourth aspect and the fifth aspect. Optionally, the intelligent system further includes the apparatus according to the sixth aspect.

According to an eleventh aspect, a computer program product is provided. The computer program product includes a computer program (which may also be referred to as code or instructions). When the computer program is run, a computer performs the method according to any one possible implementation of any one of the foregoing aspects.

According to a twelfth aspect, a computer-readable storage medium is provided. The computer-readable storage medium stores a computer program (which may also be referred to as code or instructions). When the computer program is run on a computer, the computer is enabled to perform the method according to any one possible implementation of any one of the foregoing aspects.

DETAILED DESCRIPTION OF ILLUSTRATIVE EMBODIMENTS

The following describes technical solutions of this application with reference to accompanying drawings.

In a scenario in which many persons are watching a presentation on a same large screen display together, each person has a different viewing habit, and therefore it is necessary to perform related configuration switching. The switching is often manually performed by a user using a remote control. However, the remote control usually has many settings, making it difficult for the elderly and children to operate, expensive to learn, and difficult to remember.

For example, the elderly usually like to watch a presentation on a large screen display through a set-top box, while the young usually like to watch a presentation on a large screen display through video software.

For example, for children, parental companionship is usually required, so as to limit the watch duration and content of children. It is difficult to control the watch content of the children when parents are not around them.

In view of the problems present in the foregoing scenarios, the embodiments of this application provide a mode configuration method and a mode configuration apparatus, so that personalized setting can be performed based on user watch habits, and watch mode configuration and content recommendation are automatically adapted for different users through a face recognition device, which is beneficial to improving user experience.

Before the mode configuration method and mode configuration apparatus provided in the embodiments of this application are described, the following descriptions are made.

In the embodiments of this application, terms such as "first" and "second" are used in the embodiments of this application to distinguish between same items or similar items that have basically the same functions or purposes. For example, a first terminal device and a second terminal device are merely intended to distinguish between different terminal devices, but not to limit a sequential order thereof. A person skilled in the art may understand that the words such as "first" and "second" do not limit a quantity and an execution sequence, and the words such as "first" and "second" do not indicate a definite difference.

It should be noted that, in this application, terms such as "an example" or "for example" are used to indicate an example, an illustration, or an explanation. Any embodiment or design solution described by using "an example" or "for example" in this application should not be construed as being more preferred or advantageous than other embodiments or design solutions. To be precise, the terms such as "an example" or "for example" are intended to present a related concept in a specific manner.

The mode configuration method and mode configuration apparatus provided in the embodiments of this application can be applied to a terminal device with a display function. The terminal device may be used to watch a video, receive a message, and the like.

Figure 1:
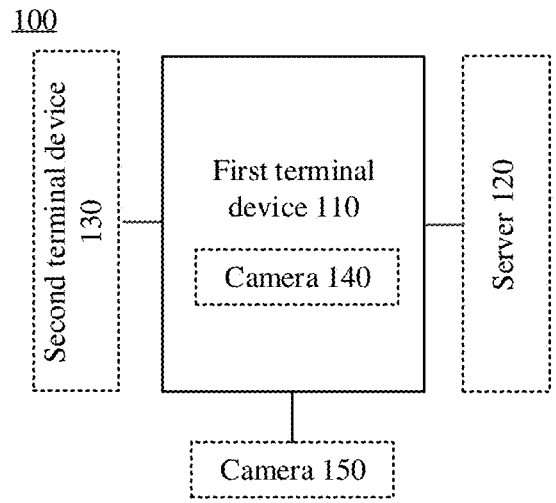
FIG. 1 is a schematic diagram of a scenario architecture to which an embodiment of this application is applicable.

FIG. 1 is a schematic diagram of a scenario architecture 100 to which an embodiment of this application is applicable. The scenario architecture 100 includes a first terminal device 110.

The first terminal device 110 may include: a large screen display (or called a smart screen display), a mobile phone, a tablet computer, a smartwatch, a smart wristband, a smart earphone, smart glasses, another terminal device with a display screen, or the like. This is not limited in this embodiment of this application.

In a possible design, the first terminal device 110 includes a built-in camera 140 for collecting biological information (for example, face information) of a user.

In another possible design, the first terminal device 110 includes a universal serial bus (universal serial bus, USB) interface, and the first terminal device 110 may be connected to an external camera 150 through the USB interface. Similarly, the external camera 150 is also configured to collect biological information (for example, face information) of a user.

It should be understood that, when the first terminal device is not equipped with the built-in camera 140, the first terminal device may be connected to the external camera 150 through the USB interface to obtain the biological information of the user.

In addition, the user can set his/her own configuration information in many different ways. In a possible design, the first terminal device 110 may display a setting screen for the user to perform personalized settings on configuration information of the first terminal device 110.

Optionally, the foregoing scenario architecture 100 includes a server 120 and a second terminal device 130.

The server 120 may include a storage module and a processing module. The storage module may be configured to store at least one of the configuration information of the first terminal device, the biological information of the user obtained through the camera (the camera 140 or the camera 150), or a watch history of the user. The processing module may analyze and process the watch history of the user.

The second terminal device 130 may include: a mobile phone, a tablet computer, a smartwatch, a smart wristband, another terminal device with a networking function, or the like.

In a possible design, the second terminal device 130 may include a camera (built-in or external, which is not limited), which is also configured to identify the biological information (for example, face information) of the user. The second terminal device 130 and the first terminal device 110 are connected to the server 120 through a network. A control control application (application, APP) that can control the first terminal device 110 is installed on the second terminal device 130, and the user may alternatively perform personalized settings on the configuration information of the first terminal device 110 through the control APP.

It should be understood that when the second terminal device 130 includes a camera, the first terminal device 110 may be equipped with a camera (the camera 140 or the camera 150), or not be equipped with any built-in or external camera. This is not limited in this embodiment of this application.

Optionally, the first terminal device 110 may manage and store operation records of the first terminal device 110.

Optionally, the server 120 may manage and store the operation records of the first terminal device 110.

For ease of understanding, hereinafter, this application will be described by using an example in which the first terminal device 110 is a large screen display, the second terminal device 130 is a mobile phone, and the biological information of the user is face information.

When the first terminal device 110 is a large screen display, its configuration information may include at least one of signal source, volume, brightness, watch duration, watch mode, or watch category.

The large screen display may provide the user with video input sources (that is, signal sources) in different signal modes. For example, the signal source may include at least one of a video (AV) signal source, a video graphic array (video graphic array, VGA) signal source, a high definition multimedia interface (high definition multimedia interface, HDMI) signal source, a television (television, TV) signal source, a digital television (digital television, DTV) signal source, or a USB video source.

When the first terminal device 110 is a large screen display, the operation records stored by the server 120 or the large screen display may include personalized settings that the user performed on the large screen display and the watch history of the user.

When the first terminal device 110 is a large screen display, the user may perform personalized settings on the configuration information of the large screen display by using a remote control.

When the first terminal device 110 is a large screen display and the second terminal device 130 is a mobile phone, the user may perform personalized settings on the configuration information of the large screen display through the control APP on the mobile phone.

Figure 2:
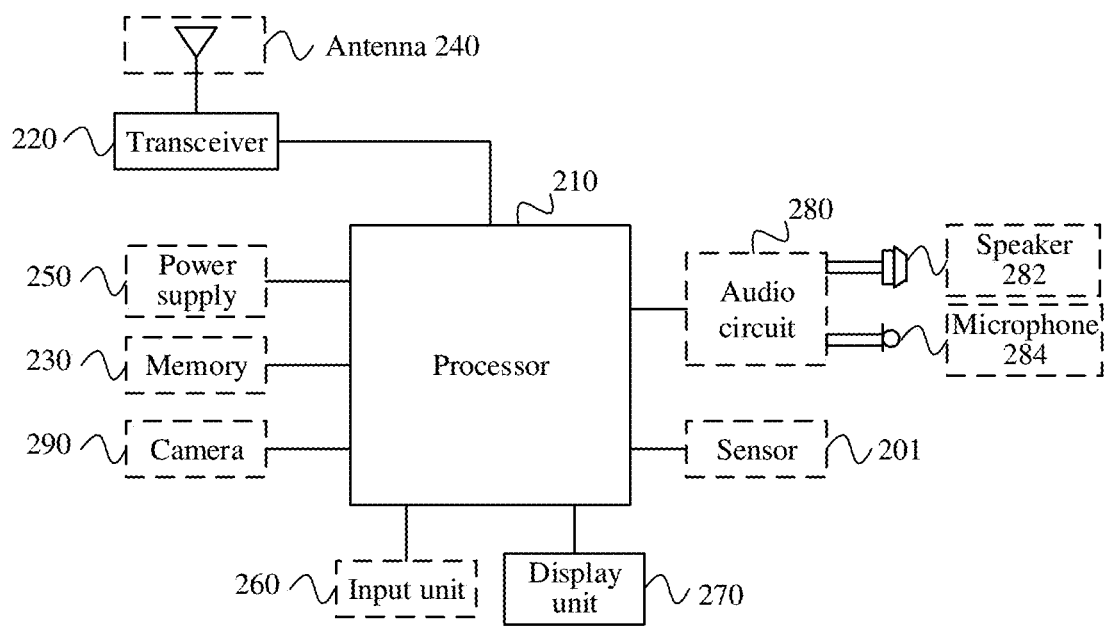
FIG. 2 is a schematic diagram of a hardware system architecture of a large screen display according to an embodiment of this application.

FIG. 2 is a schematic diagram of a hardware system architecture of a large screen display according to an embodiment of this application.

As shown in FIG. 2, the large screen display includes a processor 210, a transceiver 220, and a display unit 270. The display unit 270 may include a display.

Optionally, the large screen display may further include a memory 230. The processor 210, the transceiver 220, and the memory 230 may communicate with each other by using an internal connection channel to transfer control and/or data signals. The memory 230 is configured to store a computer program. The processor 210 is configured to call and run the computer program from the memory 230.

Optionally, the large screen display may further include an antenna 240 for sending out a wireless signal output by the transceiver 220.

The processor 210 and the memory 230 may be combined into a processing apparatus, and more commonly, may be independent components. The processor 210 is configured to execute program code stored in the memory 230 to implement the foregoing functions. During specific implementation, the memory 230 may alternatively be integrated in the processor 210, or be independent of the processor 210.

In addition, to achieve more comprehensive functions for the large screen display, the large screen display may further include one or more of an input unit 260, an audio circuit 280, a sensor 201, and the like, and the audio circuit may further include a speaker 282, a microphone 284, and the like.

Optionally, the foregoing large screen display may further include a camera 290 for obtaining biological information of a user, for example, face information.

Optionally, the foregoing large screen display may further include a power supply 250 for supplying power to various devices or circuits in the large screen display.

It can be understood that operations and/or functions of various modules in the large screen display of FIG. 2 are intended to respectively implement corresponding procedures in the method embodiment below. For details, refer to descriptions in the method embodiment below. To avoid repetition, detailed descriptions are omitted herein as appropriate.

It can be understood that the processor 210 in the large screen display of FIG. 2 may include one or more processing units. For example, the processor 210 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be separate devices or be integrated into one or more processors.

A memory may be further provided in the processor 210 to store instructions and data. In some embodiments, the memory in the processor 210 is a cache memory. The memory may store instructions or data that the processor 210 has just used or used repeatedly. If the processor 210 needs to use the instructions or the data again, the processor 210 may directly call the instructions or the data from the memory, thereby avoiding repeated access, reducing waiting time of the processor 210, and improving system efficiency.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus and includes a serial data line (serial data line, SDA) and a serial clock line (serial clock line, SCL). In some embodiments, the processor 210 may include multiple sets of I2C buses. The processor 210 may be coupled to a touch sensor 180K, a charger, a flash, the camera 290, and the like by using different I2C bus interfaces. For example, the processor 210 may be coupled to the touch sensor 180K by using an I2C interface, so that the processor 210 communicates with the touch sensor 180K by using the I2C bus interface, thereby implementing a touch function of the large screen display.

The I2S interface may be used for audio communication. In some embodiments, the processor 210 may include multiple sets of I2S buses. The processor 210 may be coupled to the audio circuit 280 by using an I2S bus to implement communication between the processor 210 and the audio circuit 280. In some embodiments, the audio circuit 280 may transmit an audio signal to the transceiver 220 through the I2S interface, to implement a function of answering voice calls through a Bluetooth earphone.

The PCM interface may also be used for audio communication to sample, quantize, and encode an analog signal. In some embodiments, the audio circuit 280 and the transceiver 220 may be coupled by using a PCM bus interface. In some embodiments, the audio circuit 280 may alternatively transmit an audio signal to the transceiver 220 through the PCM interface, to implement a function of answering voice calls through the Bluetooth earphone. Both the I2S interface and the PCM interface may be used for audio communication.

A UART interface is a universal serial data bus used for asynchronous communication. The bus may be a bidirectional communications bus that converts to-be-transmitted data between serial communication and parallel communication. In some embodiments, the UART interface is generally configured to connect the processor 210 to the transceiver 220. For example, the processor 210 communicates with a Bluetooth module of the transceiver 220 through the UART interface, to implement a Bluetooth function. In some embodiments, the audio circuit 280 may transmit an audio signal to the transceiver 220 through the UART interface, to implement a function of playing music through a Bluetooth earphone.

A MIPI interface may be configured to connect the processor 210 to the display unit 270, the camera 290, and other peripheral devices. The MIPI interface includes a camera serial interface (camera serial interface, CSI), a display serial interface (display serial interface, DSI), and the like. In some embodiments, the processor 210 communicates with the camera 290 by using the CSI interface, to implement a shooting function of the large screen display. The processor 210 communicates with the display unit 270 by using the DSI interface, to implement a display function of the large screen display.

A GPIO interface may be configured through software. The GPIO interface may be configured as a control signal or a data signal. In some embodiments, the GPIO interface may be configured to connect the processor 210 to the camera 290, the display unit 270, the transceiver 220, the audio circuit 280, the sensor 201, and the like. The GPIO interface may alternatively be configured as an I2C interface, an I2S interface, a UART interface, a MIPI interface, or the like.

It can be understood that an interface connection relationship between the modules illustrated in the embodiments of this application is merely an example for description, and does not constitute a limitation on a structure of the large screen display. In some other embodiments of this application, the large screen display may alternatively use an interface connection manner different from those in the foregoing embodiments or a combination of a plurality of interface connection manners.

It can be understood that the power supply 250 of FIG. 2 is configured to supply power to the processor 210, the memory 230, the display unit 270, the camera 290, the input unit 260, the transceiver 220, and the like.

The antenna 240 is configured to transmit and receive electromagnetic wave signals. Each antenna in the large screen display may be configured to cover one or more communications frequency bands. Different antennas may each be used for multiple purposes to improve antenna utilization. For example, the antenna 240 may also be used as a diversity antenna of a wireless local area network. In some other embodiments, the antenna may be used in combination with a tuning switch.

The transceiver 220 may provide wireless communication solutions for application to the large screen display, which include, for example, wireless local area network (wireless local area networks, WLAN) (for example, wireless fidelity (wireless fidelity, Wi-Fi) network), Bluetooth (bluetooth, BT), global navigation satellite system (global navigation satellite system, GNSS), frequency modulation (frequency modulation, FM), near field communication (near field communication, NFC), and infrared (infrared, IR). The transceiver 220 may be one or more devices integrating at least one communication processing module. The transceiver 220 receives an electromagnetic wave through the antenna 240, performs frequency modulation and filtering processing on the electromagnetic wave signal, and transmits the processed signal to the processor 210. The transceiver 220 may also receive a to-be-transmitted signal from the processor 210, perform frequency modulation and amplification on the signal, and transmit the signal as an electromagnetic wave using the antenna 240.

In some embodiments, the antenna 240 of the large screen display is coupled to the transceiver 220, so that the large screen display can communicate with a network and another device by using a wireless communications technology. The wireless communications technology may include global system for mobile communications (global system for mobile communications, GSM), general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, IR, and/or the like. The GNSS may include the global positioning system (global positioning system, GPS), the global navigation satellite system (global navigation satellite system, GLONASS), the Beidou navigation satellite system (beidou navigation satellite system, BDS), the quasi-zenith satellite system (quasi-zenith satellite system, QZSS), and/or the satellite based augmentation systems (satellite based augmentation systems, SBAS).

The large screen display implements a display function by using the GPU, the display unit 270, the application processor, and the like. The GPU is an image processing microprocessor, and is connected to the display unit 270 and the application processor. The GPU is configured to perform mathematics and geometrical calculation for graphics rendering. The processor 210 may include one or more GPUs that execute program instructions to generate or change display information.

The display unit 270 is configured to display an image, a video, and the like. The display unit 270 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), and the like. In some embodiments, the large screen display may include one or N display units 270, where N is a positive integer greater than 1.

The large screen display may implement the shooting function by using the ISP, the camera 290, the video codec, the GPU, the display unit 270, the application processor, and the like.

The ISP is configured to process data fed back by the camera 290. For example, during video recording, the camera is turned on, allowing light to be transmitted to a photosensitive element of the camera through a lens. An optical signal is converted into an electrical signal. The photosensitive element of the camera transfers the electrical signal to the ISP for processing, so as to convert the electrical signal into an image visible to the naked eyes. The ISP may further optimize noise, brightness, and skin color of the image using algorithms. The ISP may further optimize parameters such as exposure and color temperature of a shooting scene. In some embodiments, the ISP may be disposed in the camera 290.

The camera 290 is configured to capture a static image or a video. An optical image is generated for an object by using the lens, and is projected onto the photosensitive element. The photosensitive element may be a charge coupled device (charge coupled device, CCD) or a complementary metal-oxide semiconductor (complementary metal-oxide semiconductor, CMOS) phototransistor. The photosensitive element converts an optical signal into an electrical signal, and then transfers the electrical signal to the ISP which converts the signal into a digital image signal. The ISP outputs the digital image signal to the DSP for processing. The DSP converts the digital image signal into an image signal in a standard format such as RGB or YUV. In some embodiments, the large screen display may include one or N cameras 290, where N is a positive integer greater than 1.

The digital signal processor is configured to process digital signals, able to process not only digital image signals but also other digital signals. For example, when the large screen display selects a frequency, the digital signal processor is configured to perform Fourier transform or the like on frequency energy.

The video codec is configured to compress or decompress a digital video. The large screen display may support one or more types of video codecs. In this way, the large screen display may play or record videos in a plurality of encoding formats, for example, the moving picture experts group (moving picture experts group, MPEG) 1, MPEG2, MPEG3, and MPEG4.

The NPU is a neural-network (neural-network, NN) computing processor, quickly processes input information by using a biological neural network structure, for example, by using a transfer mode between human-brain neurons, and can also perform continuous self-learning. By using the NPU, an application such as intelligent cognition of the large screen display may be implemented, for example, image recognition, face recognition, voice recognition, and text understanding.

The memory 230 may be configured to store computer executable program code, and the executable program code includes an instruction. The memory 230 may include a storage program area and a storage data area. The program storage area may store an operating system, an application program required by at least one function (for example, a sound playing function or an image playing function), and the like. The data storage area may store data (such as audio data and a phone book) created when the large screen display is used, and the like. In addition, the memory 230 may include a high-speed random access memory, and may further include a non-volatile memory, for example, at least one magnetic disk storage device, a flash memory device, and a universal flash storage (universal flash storage, UFS). The processor 210 runs the instructions stored in the memory 230 and/or the instructions stored in the memory that is provided in the processor, to execute various functional applications and data processing of the large screen display.

The large screen display may use the audio circuit 280, the speaker 282, the microphone 284, the application processor, and the like to implement an audio function, for example, music playback and sound recording.

The audio circuit 280 is configured to convert digital audio information into an analog audio signal output, and is also configured to convert an analog audio input into a digital audio signal. The audio circuit 280 may be further configured to encode and decode audio signals. In some embodiments, the audio circuit 280 may be provided in the processor 210, or some functional modules of the audio circuit 280 may be provided in the processor 210.

The speaker 282, also referred to as a "loudspeaker", is configured to convert an audio electrical signal into a sound signal. A user may listen to music or answer a hands-free call by using the speaker 282 of the large screen display.

The microphone 284, also referred to as a "mic" or "mike", is configured to convert a sound signal into an electrical signal. When making a call or sending a voice message, a user may input a sound signal into the microphone 284 by speaking close to the microphone 284. At least one microphone 284 may be provided in the large screen display. In some other embodiments, two microphones 284 may be provided in the large screen display, to reduce noise in addition to collecting a sound signal. In some other embodiments, the large screen display may alternatively be provided with three, four, or more microphones 284 to collect sound signals, reduce noise, identify sound sources, implement directional recording, and the like.

In FIG. 2, only the large screen display is used as an example to explain the hardware system architecture of the first terminal device 110, but it should be understood that when the first terminal device 110 is in other product forms, the first terminal device 110 can also be provided with one or more of the plurality of devices shown in FIG. 2. This is not limited in this embodiment of this application.

Figure 3:
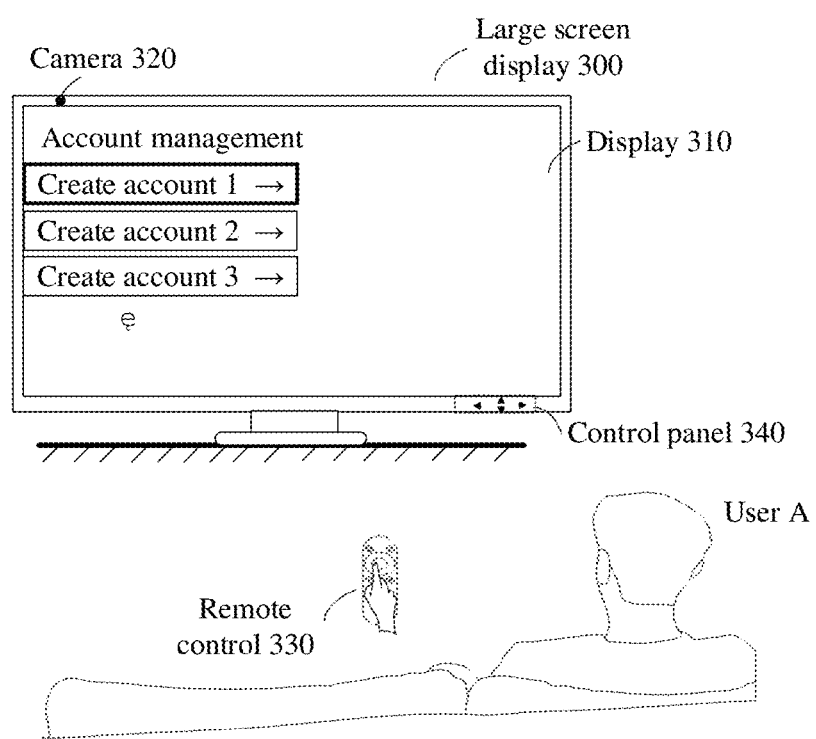
FIG. 3 is a schematic diagram of an account management screen on a large screen display according to an embodiment of this application.

FIG. 3 is a schematic diagram of an account management screen on a large screen display according to an embodiment of this application. A schematic diagram of a hardware architecture of a large screen display 300 may be shown in FIG. 2.

In one embodiment, as shown in FIG. 3, the large screen display 300 has a display 310 and a built-in camera 320. User A performs personalized settings on the large screen display 300 by using a remote control 330. Optionally, the large screen display 300 further includes a control panel 340 disposed on the frame of the large screen display 300 to implement a function similar to that of the remote control 310.

When user A turns on the large screen display 300 for the first time, in response to a first operation of turning on the large screen display 300 by the user, the large screen display may display an account management screen as shown in FIG. 3. The first operation may not be limited to an operation by user A, or an operation of an element inside the large screen display. The operation by user A may be but is not limited to: using the remote control 330 to control the large screen display to display the account management screen, voice controlling the large screen display to display the account management screen, or using buttons on the control panel 340 of the large screen display 300 to perform screen switching to display the account management screen. The operation of the element may be but is not limited to: issuing an instruction by the processor.

For example, as shown in FIG. 3, the account management screen displays three options: Create account 1, Create account 2, and Create account 3. The user may select to create his/her own exclusive account by using the remote control 330. Taking user A selecting to create account 1 as an example, after the user selects to create account 1 through an "OK" button on the remote control 330, the large screen display 300 displays a face registration screen as shown in FIG. 4.

Figure 4:
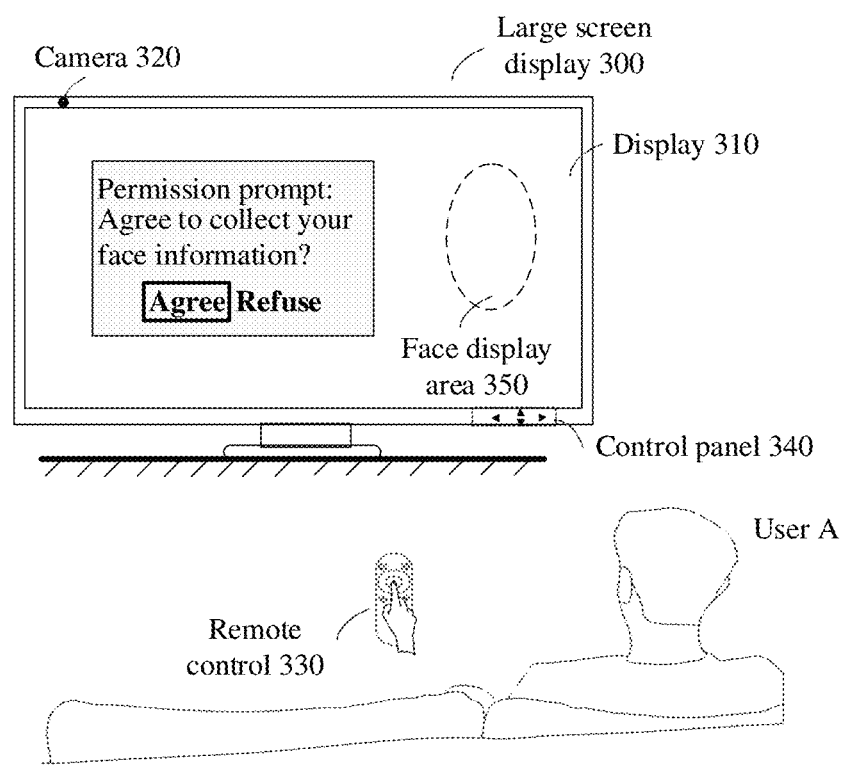
FIG. 4 is a schematic diagram of a face registration screen on a large screen display according to an embodiment of this application.

FIG. 4 is a schematic diagram of a face registration screen on a large screen display according to an embodiment of this application.

After user A selects to create account 1 by using the remote control 330, in response to a second operation of selecting to create account 1 by the user, the large screen display 300 displays a face registration screen. The face registration screen displays permission prompt information and a face display area 350. The permission prompt information is used to prompt the user about privacy rights. The face information collected by the camera 320 may be displayed in the face display area 350, allowing the user to register complete face information by adjusting angles.

Optionally, the face registration screen further includes a first selection window and a second selection window. The first selection window is used for user A to agree to register face information, and the second selection window is used for user A to refuse to register face information; It should be understood that, before user A agrees to register face information, the camera 320 may be in an off state, so as to protect the privacy of the user.

After user A selects the first selection window to agree to register face information, the camera 320 is turned on in response to a third operation of selecting to agree to register face information by the user. User A may stand in front of the camera 320, and the camera 320 starts to obtain face information of user A and displays the obtained face information in the face display area 350. It should be understood that the third operation is an operation of selecting the first selection window by user A. After the face information of user A is successfully collected, the large screen display 300 displays a schematic diagram of a signal source setting screen as shown in FIG. 5.

Figure 5:
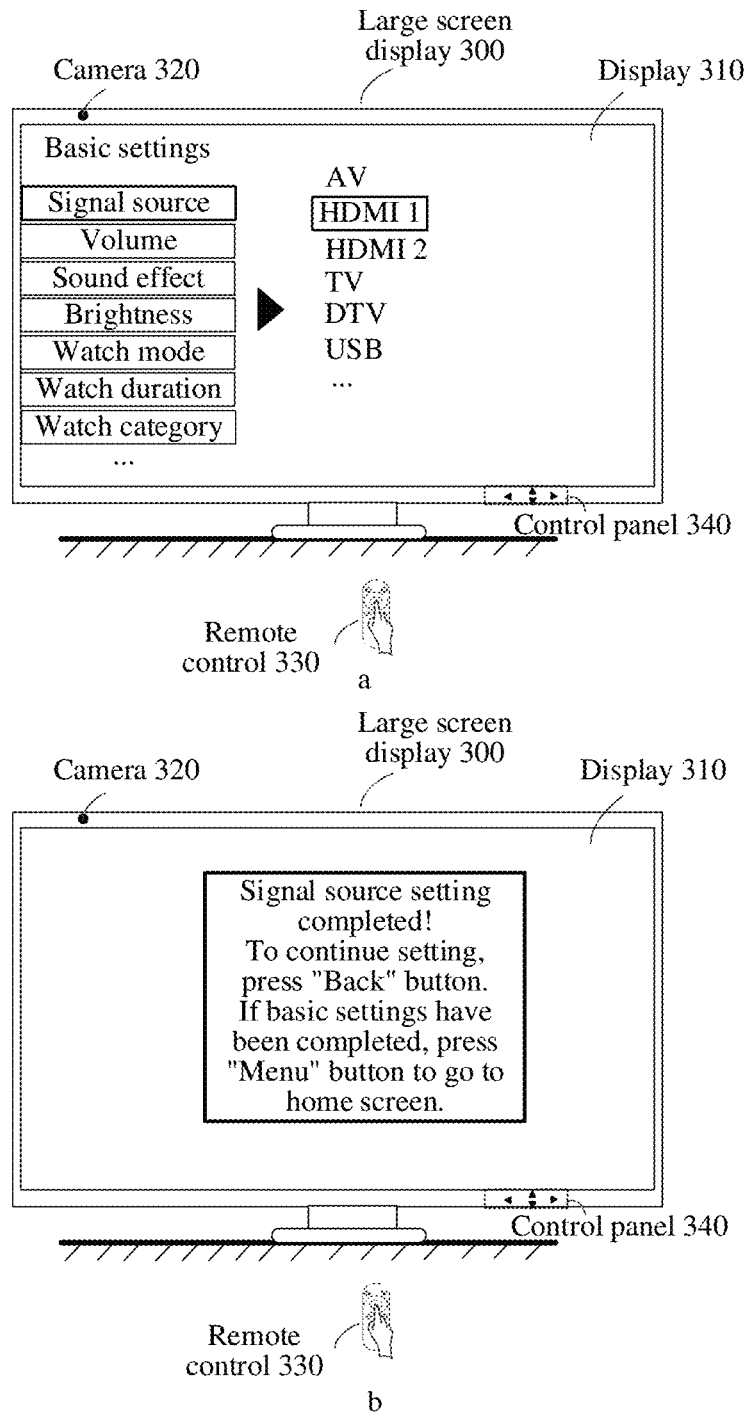
FIG. 5 is a schematic diagram of a signal source setting screen according to an embodiment of this application.

FIG. 5 is a schematic diagram of a signal source setting screen according to an embodiment of this application. As shown in screen a of FIG. 5, a plurality of option bars, such as signal source, volume, brightness, watch duration, watch mode, and watch category, are displayed on a basic settings screen of the large screen display 300.

If user A wants to set a dedicated signal source, user A may operate the remote control 330 to select the signal source option bar. After selection of the signal source option bar is confirmed, at least one of AV, HDMI 1, HDMI 2, TV, DTV, or USB may appear in screen a for user A to select.

For example, the large screen display 300 transmits audio and video signals through an HDMI cable. When setting the signal source, user A may select the HDMI 1 option bar by using the remote control 330. After selection of the HDMI 1 option is confirmed by using the "OK" button on the remote control 330, as shown in screen b of FIG. 5, the large screen display 300 displays prompt information, prompting user A that the signal source setting is completed. If user A wants to continue to set other options in the basic settings screen, user A may select the "back" button on the remote control 330 to return to the basic settings screen. If the basic settings have been completed, user A may select the "menu" button on the remote control 330 to access a home screen of the large screen display 300.

Figure 6:
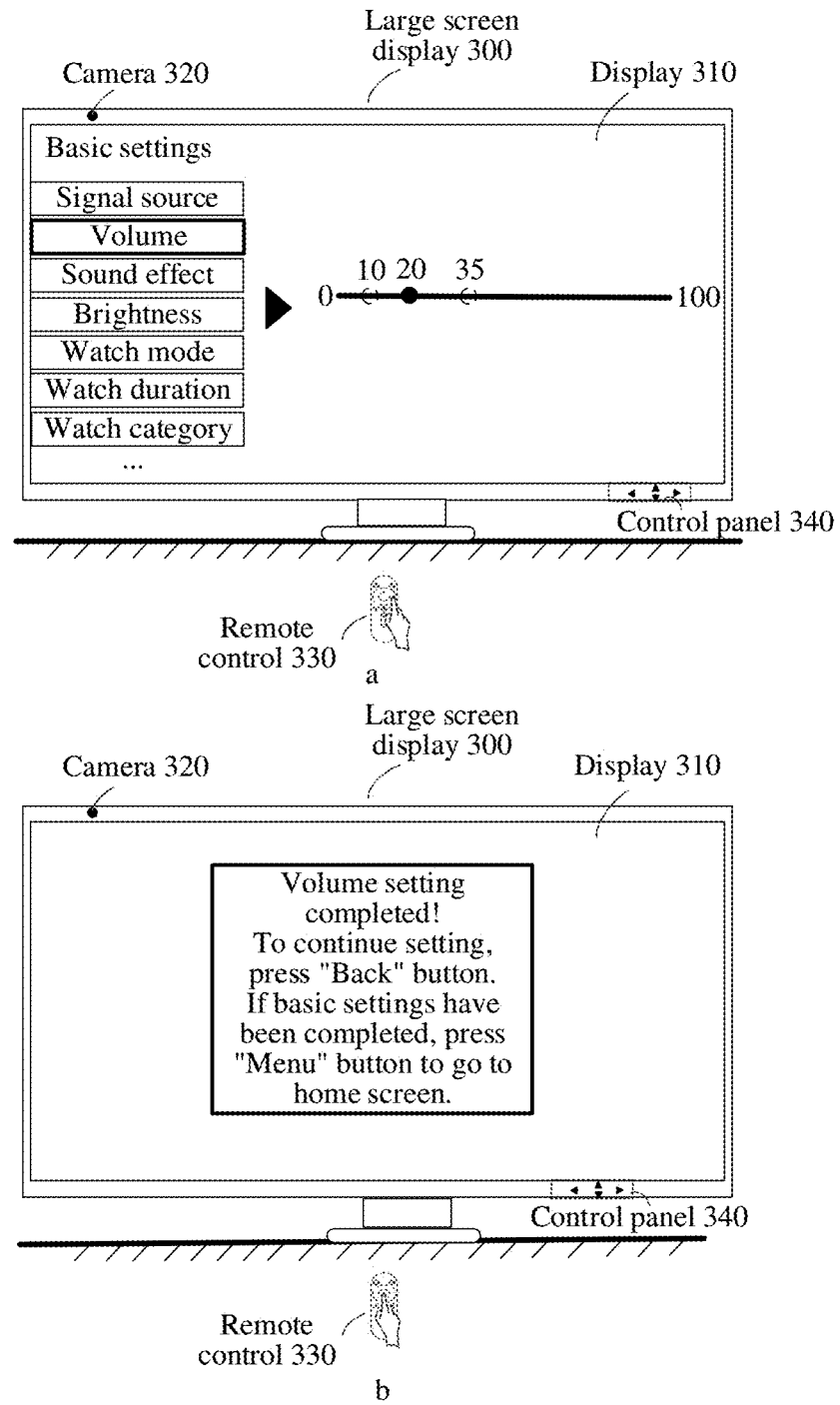
FIG. 6 is a schematic diagram of a volume setting screen according to an embodiment of this application.

FIG. 6 is a schematic diagram of a volume setting screen according to an embodiment of this application. As shown in screen a in FIG. 6, if user A wants to set a dedicated volume, user A may operate the remote control 330 to select the volume option bar. After selection of the volume option is confirmed by using the "OK" button on the remote control 330, a volume adjustment bar may appear in screen a for user A to select.

For example, user A adjusts the volume of the large screen display 300 to 20, and after selection of volume 20 is confirmed by using the "OK" button on the remote control 330, as shown in screen b of FIG. 6, the large screen display 300 displays a prompt message, prompting user A that the volume setting is completed. If user A wants to continue to set other options in the basic settings screen, user A may select the "back" button on the remote control 330 to return to the basic settings screen. If the basic settings have been completed, user A may select the "menu" button on the remote control 330 to access the home screen of the large screen display 300.

Figure 7:
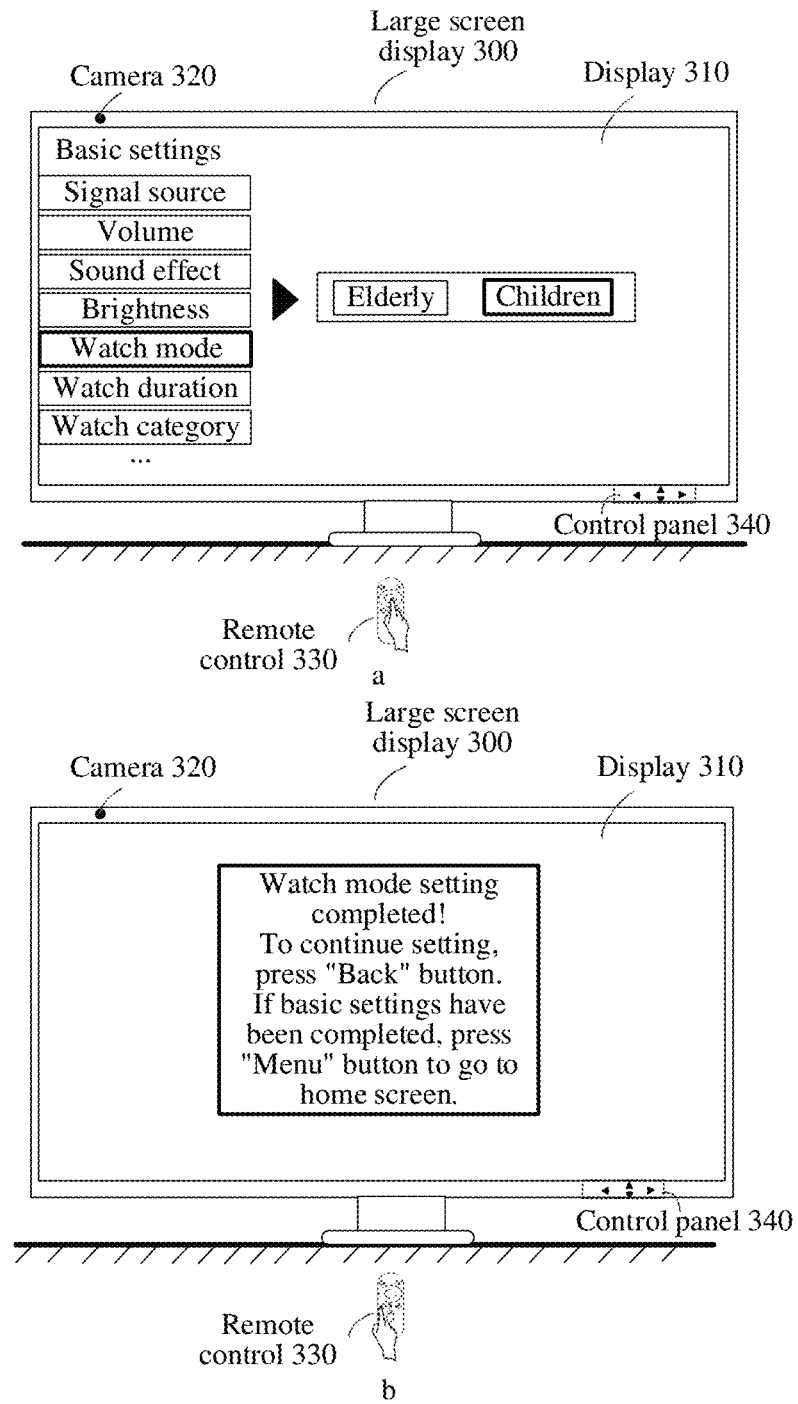
FIG. 7 is a schematic diagram of a watch mode setting screen according to an embodiment of this application.

FIG. 7 is a schematic diagram of a watch mode setting screen according to an embodiment of this application. As shown in screen a of FIG. 7, if user A wants to set a dedicated watch mode, user A may operate the remote control 330 to select the watch mode option bar. After selection of the volume option is confirmed by using the "OK" button on the remote control 330, "Elderly" or "Children" may appear in screen a for user A to select.

For example, if user A is a child, the parent may perform basic settings on the large screen display 300 and select "Children". The child mode can limit the watch content, watch duration, or screen brightness for children. For example, the large screen display 300 recommends cartoon or educational video content for children, restricts the watch duration of children to 30 minutes, and enables the screen to automatically adjust to eye comfortable mode.

Certainly, if the parent wants to shorten or extend the watch duration of children, the parent may also select the watch duration option bar to reset the watch duration for children. Alternatively, if the parent wants to select other categories of video content for children, the parent may also reset the watch category for children by selecting the watch category option bar.

For example, if user A is an elderly person, similarly, user A may select "Elderly".

As shown in screen b of FIG. 7, if user A wants to continue to set other options in the basic settings screen, user A may select the "back" button on the remote control 330 to return to the basic settings screen. If the basic settings have been completed, user A may select the "menu" button on the remote control 330 to access the home screen of the large screen display 300.

Figure 8:
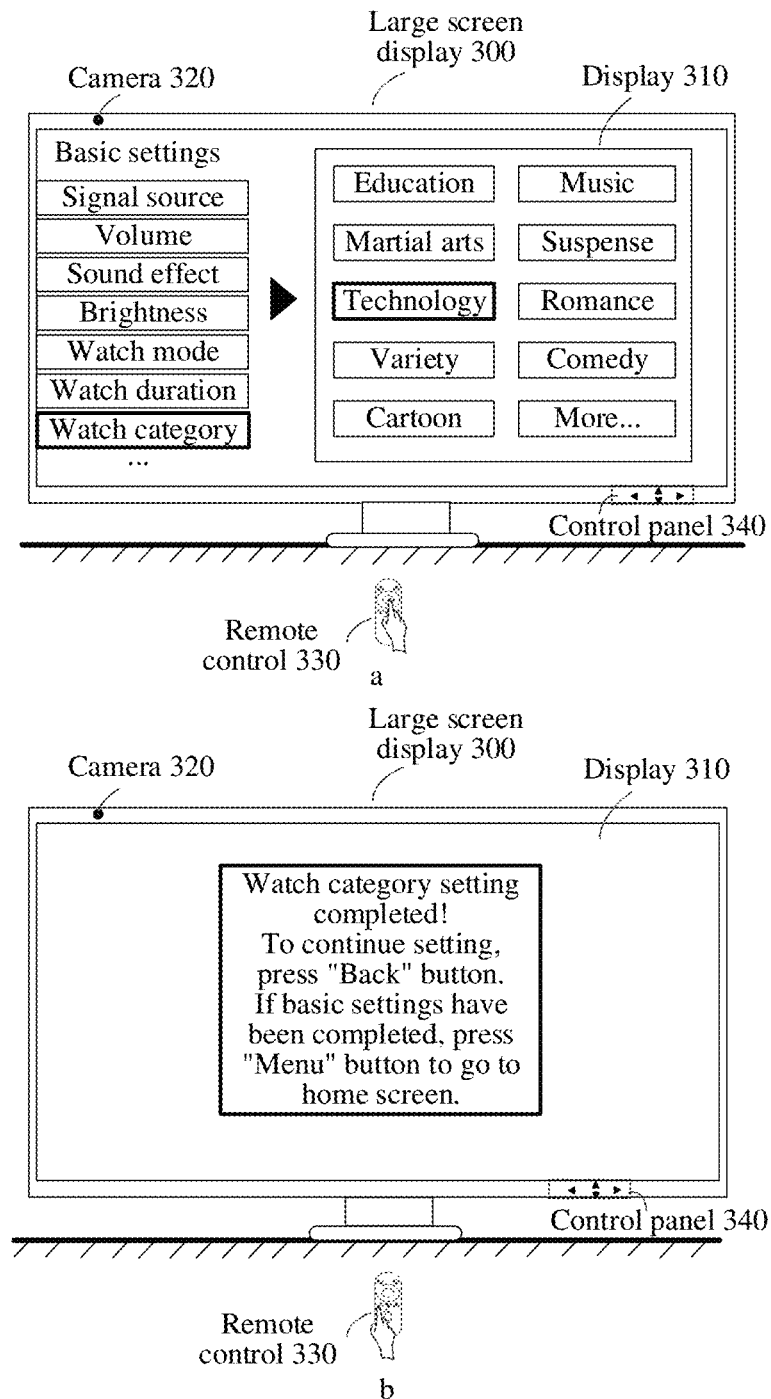
FIG. 8 is a schematic diagram of a watch category setting screen according to an embodiment of this application.

FIG. 8 is a schematic diagram of a watch category setting screen according to an embodiment of this application. As shown in screen a in FIG. 8, if user A wants to set a dedicated watch category, user A may operate the remote control 330 to select the watch category option bar, and after selection of the watch category option is confirmed by using the "OK" button on the remote control, a plurality of watch categories such as "Education", "Technology", "Martial Arts", and "Cartoon" may appear in screen a for user A to select.

For example, user A selects the video content of the "Technology" category, and after selection of the "Technology" category is confirmed by using the "OK" button on the remote control 330, as shown in screen b in FIG. 8, the large screen display 300 displays prompt information, prompting user A that the watch category setting is completed. If user A wants to continue to set other options in the basic settings screen, user A may select the "back" button on the remote control 330 to return to the basic settings screen. If the basic settings have been completed, user A may select the "menu" button on the remote control 330 to access the home screen of the large screen display 300.

Figure 9:
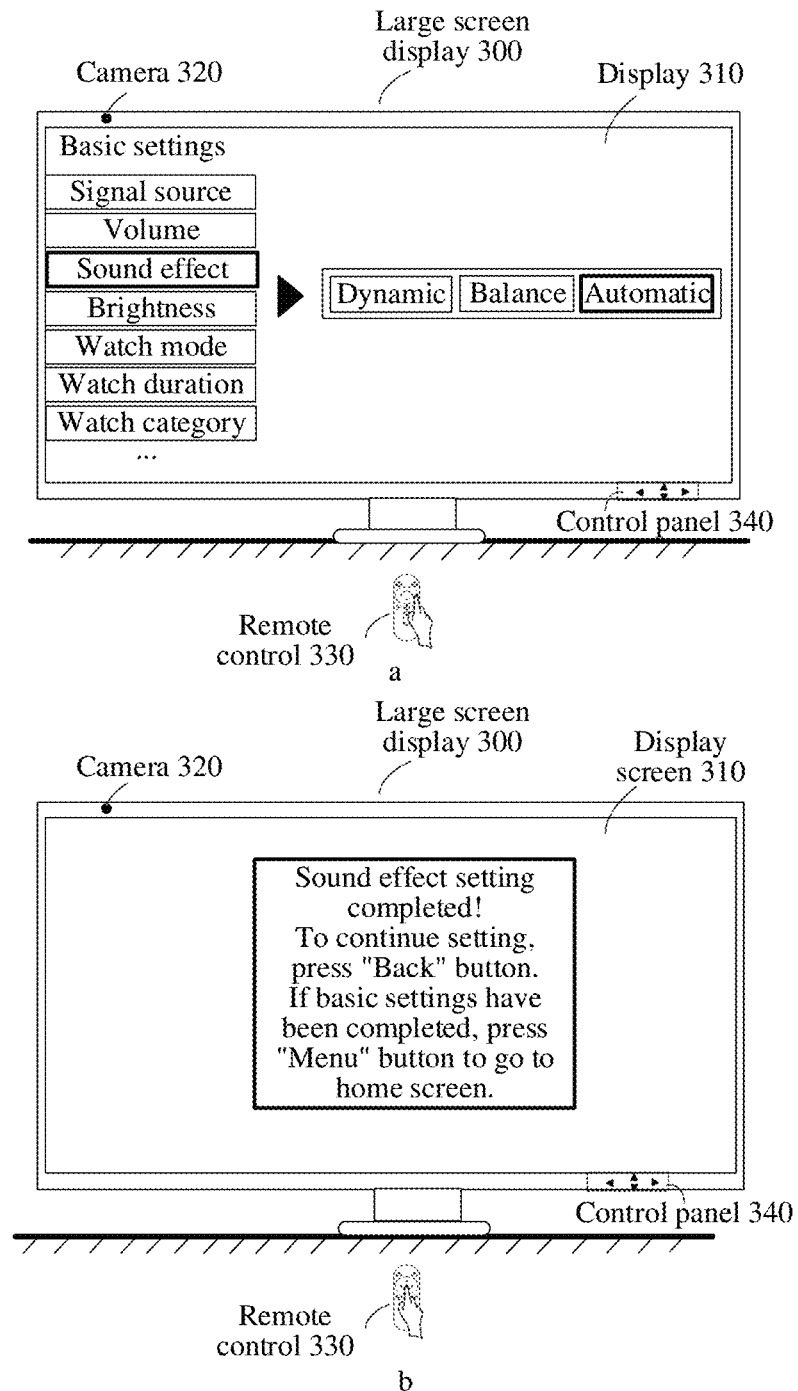
FIG. 9 is a schematic diagram of a sound effect setting screen according to an embodiment of this application.

FIG. 9 is a schematic diagram of a sound effect setting screen according to an embodiment of this application.

Similar to the foregoing processes of setting the signal source, volume, watch mode, and watch category, for example, as shown in FIG. 9, user A may set any one of sound effect "Dynamic", "Balance", or "Automatic" on screen a as his/her own dedicated sound effect. After the setting is completed, the large screen display 300 displays screen b to prompt user A that the sound effect setting is completed. Again, user A may select to continue setting or return to the home screen. A more detailed operation process is similar to that described above with reference to FIG. 5 to FIG. 8, and details are not repeated herein.

The foregoing description is made with reference to FIG. 3 to FIG. 9 by using examples that the large screen display 300 collects face information of user A, creates an account for user A, and performs personalized settings for user A. It should be understood that the large screen display 300 may be also used to collect face information of more other users, and perform personalized settings for the more other users. For example, the large screen display 300 may be used to collect face information of user B and perform personalized customization based on a watch habit of user B. The large screen display 300 may be also used to collect face information of user C and perform personalized customization based on a watch habit of user C. This is not limited in this embodiment of this application.

It should be understood that each user has his/her own corresponding face information, and the face information of each user corresponds to personalized settings information of the user, and the personalized settings information includes at least one of the foregoing signal source, volume, watch mode, watch category, sound effects, and brightness. Personalized settings information of different users may be the same or different.

Figure 10:
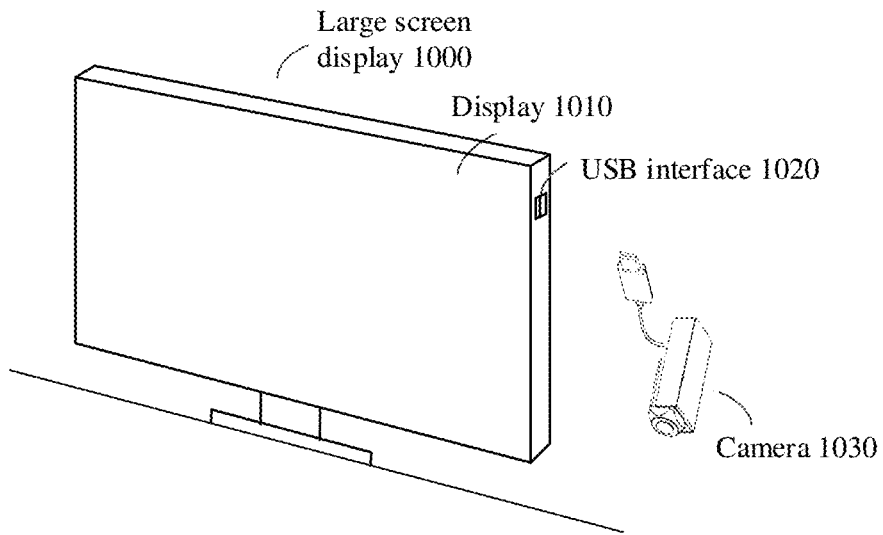
FIG. 10 is a schematic diagram of a large screen display according to an embodiment of this application.

FIG. 10 is a schematic diagram of a large screen display 1000 according to an embodiment of this application. A schematic diagram of a hardware system architecture of the large screen display 1000 may be shown in FIG. 2.

The large screen display 1000 in FIG. 10 includes a display 1010 and a USB interface 1020. Compared with the large screen display 300, the large screen display 1000 is not equipped with a camera. Therefore, the large screen display 1000 may be connected to an external camera 1030 through the USB interface 1020, and the camera 1030 can also collect biological information (for example, face information) of a user and further perform personalized settings for different biological information of the user.

It should be understood that a process of performing personalized settings based on the face information collected by the camera 1030 is similar to a process of performing personalized settings based on the face information collected by the camera 320, and details are not repeated herein.

The large screen display 300 and/or the large screen display 1000 may send the face information of different users collected by the camera (the camera 320 or the camera 1030) and the personalized settings information of different users to a server, and the server may manage, store, and analyze the information.

Optionally, the face information of different users and the personalized settings information of different users may also be stored in the large screen display locally. This is not limited in this embodiment of this application.

Optionally, the face information of different users is stored both in the large screen display locally and in the server, and the personalized settings information of different users is stored in the server.

The foregoing describes processes of collecting face information by using a camera (the camera 320 or the camera 1030) and performing personalized settings based on different face information by using a remote control. In addition, personalized settings may alternatively be performed through a second terminal device that is networked with and different from the large screen display. For example, the second terminal device may be a mobile phone or a tablet computer. It should be understood that the second terminal device has a built-in camera which can collect face information of a user.

Similar to the foregoing description, the following still assumes that user A uses the large screen display 300 for the first time. When the second terminal device is a mobile phone, user A may create an account in a control APP on the mobile phone, and the account corresponds to face information of user A. It should be understood that at least one account may be created in the control APP. For example, user B, user C, or other more users may also register their own face information to create multiple different accounts.

After the face information of user A is collected by using the mobile phone, similarly, user A may perform personalized settings on the basic settings screen. The setting process is basically similar to the setting performed by using the remote control described above, and details are not repeated herein.

After personalized settings are completed, the mobile phone may send the personalized settings information of user A to the large screen display (the large screen display 300 or the large screen display 1000). Alternatively, the mobile phone sends the personalized settings information of user A to the server, the server then sends it to the large screen display (the large screen display 300 or the large screen display 1000), and the large screen display stores the personalized settings information of user A. Alternatively, the mobile phone sends the personalized settings information of user A to the server, and the server stores the personalized settings information of user A.

It can be seen from the foregoing description that no matter whether the user performs personalized settings by using a remote control or a mobile phone, each user corresponds to an account, and personalized settings information corresponding to the face information of the user is set under the account. In addition, a plurality of users may share one account, and one of the users has management permission.

For example, a parent and a child may share one account, the parent has management permission for the shared account, and face information of the parent and the child may be registered under the account. The parent may register his/her face information under the account, and then access the basic settings screen to perform personalized settings. After that, the parent may log in to the account with his/her face or a password, register face information of the child under the account, and perform personalized settings for the child on the basic settings screen. In this example, one account may correspond to two users, and each user has respective face information and personalized settings information, which means that the face information of a user corresponds to the personalized information of the user.

For example, for a home owner and a guest, the home owner and the guest may share an account, and the home owner has management permission for the shared account. Similar to the foregoing example, the home owner may also set personalized information for himself/herself and the guest under the shared account. Face information of the home owner corresponds to personalized settings information of the home owner, and face information of the guest corresponds to personalized settings information of the guest, so that when the guest comes to visit the home, the home owner can log in to the shared account and configure corresponding video resources for the guest through the large screen display. In this way, interests and hobbies of users with different identities can be flexibly adapted to improve user experience.

The foregoing describes two manners of a user performing personalized settings when using the large screen display for the first time. It should be understood that when using the large screen display for the first time, the user may temporarily not register the face information to perform personalized settings. Subsequently during usage, if the user wants to use this function, the user may call the account management screen to execute the processes described in FIG. 3 to FIG. 9. This is not limited in this embodiment of this application. The following describes a process of a user using the large screen display based on face recognition after personalized settings are completed.

After the personalized settings are completed, taking the large screen display 300 as an example, when user A turns on the large screen display 300 a next time, the camera 320 may perform recognition on the face information of user A, so as to play video content corresponding to the personalized settings information of user A.

For example, the camera 320 may collect the face information of the user A who is currently watching the large screen display 300 and send the collected face information to the processor 210 in FIG. 2, and the processor 210 receives the face information. If the previously stored face information and personalized settings information are stored in the large screen display 300 locally, the processor 210 sends an instruction to the memory 230, where the instruction is used to retrieve the face information stored in the memory. The processor 210 compares the currently collected face information of user A with the face information stored in the memory 230 to determine that the user currently watching the large screen display 300 is user A. Then the processor 210 retrieves and processes the personalized settings information associated with the face information of user A stored in the memory 230, and finally audio and video content corresponding to the personalized settings information is presented and played for user A through mutual collaboration of various modules of the large screen display shown in FIG. 2.

It should be understood that if the user wants to modify the personalized settings information, the user may access the account management screen of the large screen display 300 or the large screen display 1000, and after the face information is recognized, the user may continue to perform the setting processes described in FIG. 5 to FIG. 9. Details are not repeated herein. In this way, the user may flexibly modify personalized settings information according to different preferences in different time periods, improving user experience.

In a possible implementation, the large screen display may collect a watch history of the user, where the view history may include watch content and/or watch time. For example, it is found from data collected by the large screen display that user A is used to watching morning news during the time period from 8:00 to 9:00 in the morning. For another example, it is found from data collected by the large screen display that user B is used to watching noon news during the time period from 12:00 to 13:00 at noon. For another example, it is found from data collected by the large screen display that user C is used to watching shows of variety category during the time period from 20:00 to 22:00 in the evening.

The large screen display may collect the watch history of the user for a lasting time period. For example, the lasting time period may be 7 days, 10 days, 30 days, or another lasting time period. This is not limited in this embodiment of this application.

After collecting the watch histories of different users in different time periods, the large screen display may store the watch history of each user in the large screen display locally or in the server, and the large screen display or the server may recommend corresponding video resources for the users. The following is described by using an example in which the watch history of each user is stored in the server.

In an example in which the watch history of the user is stored in the server, the server may perform data analysis on the stored watch history of each user, determine watch preferences of different users in different time periods, and send the watch preferences as recommended video resources to the large screen display shown in FIG. 2. The large screen display may send the video resources from the server to the processor 210 through the input unit 260. After performing processing on the video resources such as modulation, demodulation, encoding, or decoding, the processor 210 may first store the video resources in the memory 230, and recommend corresponding watch content for the user when the user uses the large screen display.

For example, still taking the large screen display in FIG. 2 as an example, user A turns on the large screen display in the time period from 8:00 to 9:00 in the morning, and accesses the home screen of the large screen display. If the camera 290 on the large screen display identifies the current user as user A, the camera 290 may send an instruction to the processor 210, where the instruction is used to indicate identity information of the current user. The processor 210 receives the instruction, retrieves the video resources recommended for user A from the memory 230, and displays the video resources on the home screen of the large screen display through the display unit 270.

In an example in which the watch history of the user is stored in the large screen display locally, the processor 210 of the large screen display may perform data analysis on the watch history of each user, determine watch preferences of different users in different time periods, store the watch preferences as recommended video resources in the memory 230, and recommend corresponding watch content for the user when the user uses the large screen display. Subsequent processing is similar to the foregoing description. Details are not repeated herein.

The foregoing video resources recommended for users by the server or large screen display are determined depending on the users. To be specific, for user A, the server or large screen display recommends video resources based on the watch preferences of user A, while for user B, the server or large screen display recommends video resources based on the watch preferences of user B. Similarly, for user C, user D, or other users, this is also true. In this way, interests and hobbies of different users can be flexibly adapted to improve user experience.

In a possible implementation, the server may recommend corresponding video resources for different users based on massive watch histories of massive users. That video resources are recommended for user A is still used as an example. Compared with the foregoing description of recommending video resources for user A by the server or large screen display based on the watch history of user A, in this implementation, the server may analyze big data of massive users to determine video resources that may be recommended for user A.

Specifically, the video resources recommended by the server for user A may be determined based on users having common characteristics with user A in the massive users. For example, the common characteristics may include at least one of gender, age group, or occupation. Therefore, the video resources recommended by the server for user A based on the big data may be the watch preferences of a large number of users having common characteristics with user A, and the watch preferences of these users may not match the personalized settings information of user A. In this case, a possible implementation is as follows: The server may filter out recommended videos that do not match the personalized settings information of user A, keep recommended video resources that are similar to the personalized settings information of user A, and send these recommended video resources to the large screen display for presenting to user A. Such a manner is more intelligent and in line with a watch habit of the user. Another possible implementation is as follows: The server performs no filtering operation, but sends the recommended videos that do not match the personalized settings information of user A to the large screen display, and then the large screen display presents the recommended videos to user A, thereby providing the user with more watch options.

The following uses an example to illustrate how a processing module of the server performs analysis.

For example, the processing module of the server may analyze massive watch histories of massive users, and classify massive data on a basis of "age group"-"time period"-"watch category". For example, users in the age group of 12 to 18 like to watch video content of cartoon category at 21:00 to 22:00 in the evening. For another example, users in the age group of 45 to 55 like to watch video content of news category at 8:00 to 9:00 in the morning.

For example, the processing module of the server may analyze massive watch histories of massive users, and classify massive data based on "gender"-"time period"-"watch category". For example, female users like to watch video content of romantic category at 20:00 to 22:00 in the evening. For example, male users like to watch video content of spoils category at 23:00 to 24:00 in the evening.

For example, the processing module of the server may analyze massive watch histories of massive users, and classify massive data on a basis of "gender"-"age group"-"time period"-"watch category". For example, female users in the age group of 30 to 40 like to watch video content of education category at 16:00 to 17:00 in the afternoon. For another example, male users in the age group of 18 to 28 like to watch video content of martial arts category at 20:00 to 21:00 in the evening. For another example, female users in the age group of 20 to 30 like to watch video content of variety category in weekend afternoon.

Taking user A as an example, after analyzing massive watch histories and deriving an analysis result, the server may determine the gender and/or age information of user A according to the face information of user A stored in the server, and then determines, according to the analysis result from the massive data and the gender and/or age information of user A, video resources and time periods that may be recommended for user A. Similarly, for user B, user C, or other users, the server may also determine video resources and time periods recommended for user B, user C, or other users.

In an example that user A uses the large screen display shown in FIG. 2, when user A uses the large screen display, the camera 290 on the large screen display may recognize the face information of user A, and the camera 290 sends an instruction to the processor 210, where the instruction is used to indicate identity information of the user. After receiving the instruction, the processor 210 may send a request message to the server through the transceiver 220 and the antenna 240, where the request message is used to request the personalized settings information, recommended video resources, and recommendation time periods of user A. Accordingly, the server sends, based on the request message, personalized settings information of user A, the recommended video resources, and the recommendation time periods to the large screen display.

The video resources recommended by the server or large screen display during the recommendation time periods may be presented on the home screen of the large screen display in a form of cards, prompt information, or notification information. This is not limited in this embodiment of this application.

It should be understood that the foregoing gender and age of the user may be determined not only by using the face information, but also by using the basic personal information input by the user through a control APP on the mobile phone. The mobile phone may send the personal basic information to the server, and the server stores the personal basic information.

Optionally, the personal basic information stored in the server may also include occupational information of the user. For example, based on the occupational information, the processing module of the server may classify massive data on a basis of "gender"-"age group"-"occupation"-"watch category", or "age group"-"occupation"-"watch category".

The server or large screen display may recommend video resources for the user within a recommendation cycle, where the recommendation cycle may be 3 days, 7 days, 10 days, or other days. After a recommendation cycle ends, the server or large screen display may perform data analysis again based on the watch history of the user or the massive watch histories of massive users, and adjust the recommended video resources and recommendation time periods to bring a better user experience.

Figure 11:
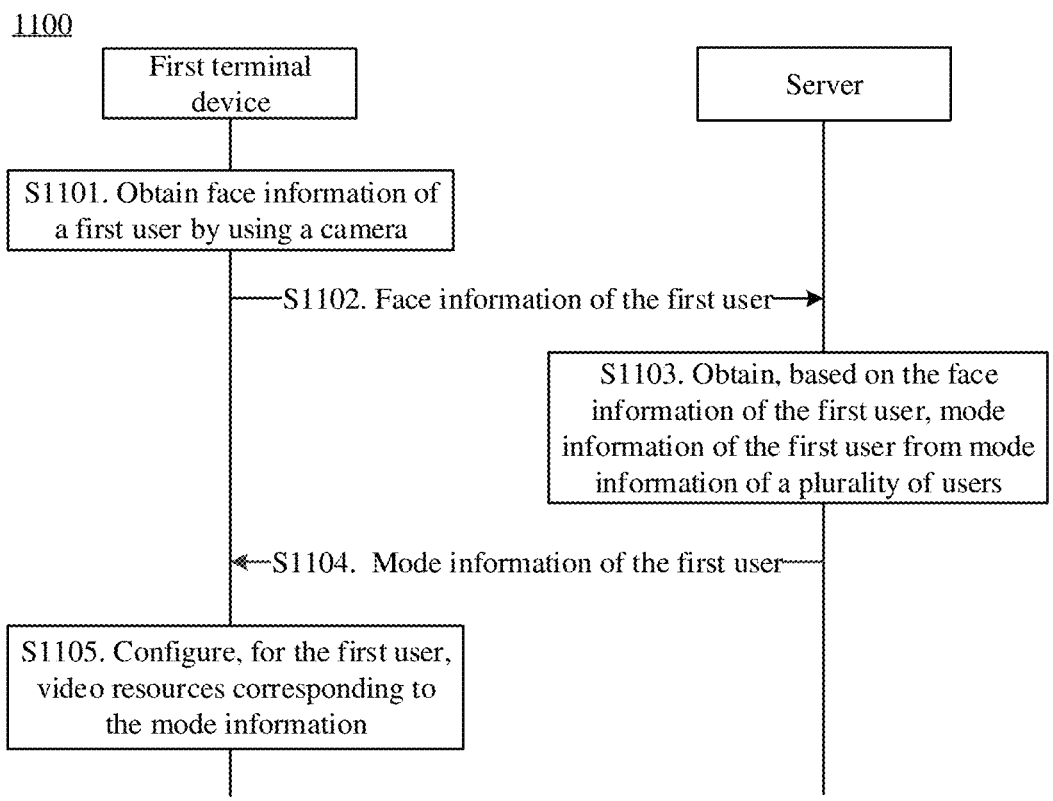
FIG. 11 is a schematic flowchart of a mode configuration method according to an embodiment of this application.

FIG. 11 is a schematic flowchart of a mode configuration method 1100 according to an embodiment of this application. The method 1100 is applied to an intelligent system including a first terminal device and a server, where the first terminal device is equipped with a camera. The method 1100 includes the following steps.

S1101. The first terminal device obtains face information of a first user by using the camera, and sends the face information of the first user to the server. Correspondingly, the server receives the face information of the first user.

S1102. The server obtains, based on the face information of the first user, mode information of the first user from mode information of a plurality of users, where the mode information includes personalized settings information and video resource recommendation information.

S1103. The server sends the mode information of the first user to the first terminal device. Correspondingly, the first terminal device receives the mode information of the first user.

S1104. The first terminal device configures, for the first user, video resources corresponding to the mode information.

Optionally, the personalized settings information includes at least one of signal source, volume, watch mode, watch category, watch duration, brightness, or sound effect.

Optionally, that the first terminal device configures, for the first user, video resources corresponding to the mode information includes: displaying, by the first terminal device, a page corresponding to the signal source specified for the first user, where the page includes video resource recommended by the server and video resources that are presented in a form of cards and that correspond to the watch category specified for the first user.

Optionally, before the method S1100, further includes: displaying, by the first terminal device, a first face registration screen in response to an operation of creating an account by the first user, where the first face registration screen includes a first selection window and a second selection window, the first selection window is used for agreeing to register face information, and the second selection window is used for refusing to register face information; and obtaining, by the first terminal device by using the camera, the face information of the first user in response to an operation of agreeing to register face information by the first user.

Optionally, after the obtaining, by the first terminal device by using the camera, the face information of the first user in response to an operation of agreeing to register face information by the first user, the method further includes: displaying, by the first terminal device, a first basic settings screen, so that the first user performs personalized settings on the first basic settings screen to generate personalized settings information of the first user; sending, by the first terminal device, the face information of the first user and the personalized settings information of the first user to the server; and receiving and storing, by the server, the face information of the first user and the personalized settings information of the first user.

Optionally, the camera is built into the first terminal device.

Optionally, the camera is connected to the first terminal device by a connection cable.

Optionally, the method 1100 further includes: receiving and storing, by the server, a watch history of the first user; and determining, by the server based on the watch history of the first user, the video resource recommendation information and recommendation time period information of the first user.

Optionally, the watch history includes at least one of the face information, watch category, or watch time period of the first user.

Optionally, the method 1100 further includes: receiving and storing, by the server, watch histories of a plurality of users; and classifying, by the server, the watch histories of the plurality of users to determine the video resource recommendation information and recommendation time period information of the first user.

Optionally, the classifying, by the server, the watch histories of the plurality of users to determine the video resource recommendation information and recommendation time period information of the first user includes: classifying, by the server on a basis of "age group"-"time period"-"watch category", the watch histories of the plurality of users to determine a plurality of categories; determining, by the server based on the face information of the first user, an age group to which the first user belongs; and determining, by the server based on the age group to which the first user belongs and the plurality of categories, the video resource recommendation information and the recommendation time period information of the first user.

Optionally, the classifying, by the server, the watch histories of the plurality of users to determine the video resource recommendation information and recommendation time period information of the first user includes: classifying, by the server on a basis of "gender"-"time period"-"watch category", the watch histories of the plurality of users to determine a plurality of categories; determining, by the server based on the face information of the first user, a gender of the first user; and determining, by the server based on the gender of the first user and the plurality of categories, the video resource recommendation information and recommendation time period information of the first user.

In this embodiment of this application, the user can perform face information registration and face recognition based on the camera of the first terminal device, and the first terminal device can automatically configure corresponding play modes according to different watch preferences of different users. Face recognition technology can be used to accurately identify different users, improving recognition accuracy. In addition, the large screen display or server can also use big data to recommend video resources for users, helping improve user experience and user viscosity.

Figure 12:
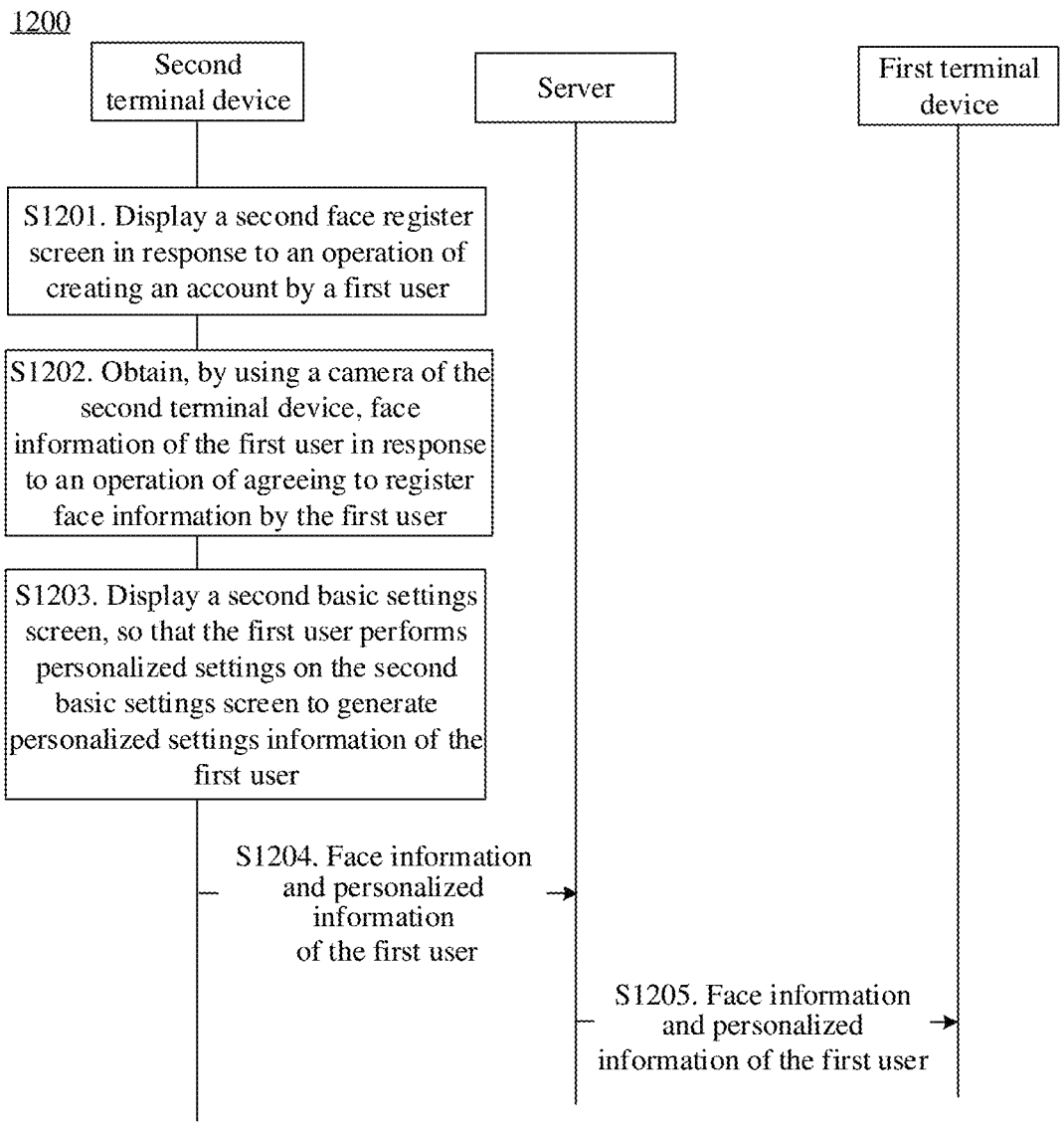
FIG. 12 is a schematic flowchart of another mode configuration method according to an embodiment of this application.

FIG. 12 is a schematic flowchart of another mode configuration method 1200 according to an embodiment of this application. The method 1200 is applied to an intelligent system including a first terminal device, a second terminal device, and a server, where the first terminal device is equipped with a camera, and the second terminal device is equipped with a camera. The method 1200 includes the following steps:

S1201. The second terminal device displays a second face registration screen in response to an operation of creating an account by a first user, where the second face registration screen includes a third selection window and a fourth selection window, the third selection window is used for agreeing to register face information, and the fourth selection window is used for refusing to register face information.

S1202. The second terminal device obtains, by using the camera of the second terminal device, face information of the first user in response to an operation of agreeing to register face information by the first user.

S1203. The second terminal device displays a second basic settings screen, so that the first user performs personalized settings on the second basic settings screen to generate personalized settings information of the first user.

S1204. The second terminal device sends the face information of the first user and the personalized settings information of the first user to the server. Correspondingly, the server receives and stores the face information of the first user and the personalized settings information of the first user.

After the method 1200, when the user uses the first terminal device, the first terminal device may perform the steps of the foregoing method 1100. Details are not repeated herein.

Optionally, after S1204, the method further includes S1205, that is, the server sends the face information of the first user and the personalized settings information of the first user to the first terminal device. Correspondingly, the first terminal device receives and stores the face information of the first user and the personalized settings information of the first user.

In this embodiment of this application, the user can register the face information by using the second terminal device (such as a mobile phone) different from the first terminal device, perform personalized settings on the second terminal device, and then store the face information and the personalized settings information in the server. Similarly, when the user uses the first terminal device, the first terminal device may perform the steps and/or processes corresponding to the first terminal device in the foregoing method 1100 to configure, for the user, the video resources corresponding to the personalized settings information. In this way, the user can set the configuration information of the first terminal device on the second terminal device, which provides the user with more operation options.

The first terminal device may also recognize different users based on voiceprint information of users. A difference from the method of user recognition based on face information is that the user creates a voiceprint account when creating an account using the large screen display. To be specific, a voiceprint collection module of the large screen display may collect voiceprint information of the user, the user can configure personalized settings information corresponding to the voiceprint information. Other operations are similar to those described above, and details are not repeated herein.

In this embodiment of this application, the personalized settings information of the user is obtained based on the face recognition. Optionally, the personalized settings information of the user may alternatively be obtained based on the voiceprint information or fingerprint information of the user or the like. This is not limited in this embodiment of this application.

In addition to the mode switching scenario in which different users watch a large screen display, the mode configuration method of this embodiment of this application may be applied to scenarios such as voice calls and smart fitness.

For example, in a voice call scenario, the foregoing first terminal device may be a mobile phone. User A is used to adjusting the call volume of the mobile phone to 30% and the screen brightness of the mobile phone to the lowest level during the voice call. Under such user requirements, similar to the foregoing recognition of the face information of the user by using the large screen display, user A can register his/her face information on the mobile phone to create an account. Under the account associated with the face information of user A, user A can perform personalized settings to set a customary call volume and/or a screen brightness for voice calls, so that when user A is in a voice call, the mobile phone can retrieve the personalized settings information of user A based on the recognized face information and automatically adjust the call volume and/or screen brightness to match the personalized settings information, helping improve user experience.

For example, in a smart fitness scenario, the foregoing first terminal device may be a smart fitness equipment, and specifically, the smart fitness equipment is a treadmill. User B is used to adjusting the slope of the treadmill to 1%, the intensity to "Level 1", and jogging for 40 minutes during the fitness process. Under such user requirements, similar to the foregoing recognition of the face information of the user by using the large screen display, user B can perform personalized settings on the treadmill or a mobile phone connected to the treadmill to form a personalized profile.

In addition, in the smart fitness scenario, user B can also input his/her own physical information through the treadmill or the mobile phone connected to the treadmill, such as at least one of gender, age, height, weight, body fat rate, or basal metabolic rate. The treadmill or the mobile phone connected to the treadmill may analyze the physical information of user B and recommend a fitness mode suitable for user B.

It should be understood that sequence numbers of the foregoing processes do not mean execution order. The execution order of the processes should be determined based on functions and internal logic of the processes, and should not be construed as any limitation on the implementation processes of this embodiment of this application.

The foregoing describes in detail the mode configuration method according to the embodiments of this application with reference to FIG. 1 to FIG. 12. The following will describe in detail a mode configuration apparatus according to embodiments of this application with reference to FIG. 13 to FIG. 16.

Figure 13:
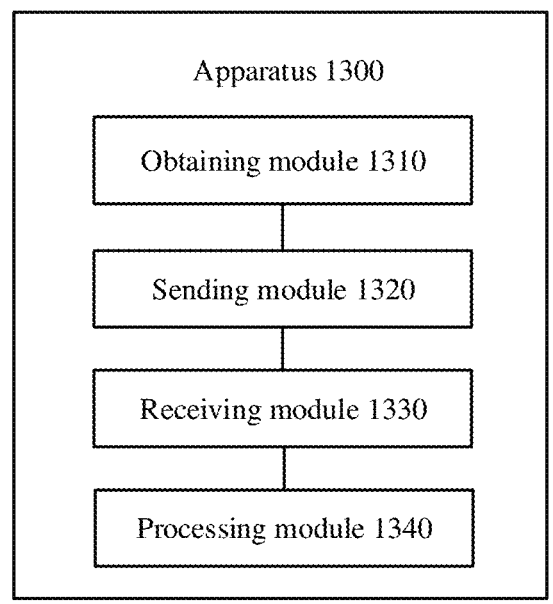
FIG. 13 is a schematic block diagram of a mode configuration apparatus according to an embodiment of this application.

FIG. 13 is a schematic block diagram of a mode configuration apparatus 1300 according to an embodiment of this application. The apparatus 1300 includes an obtaining module 1310, a sending module 1320, a receiving module 1330, and a processing module 1340.

The obtaining module 1310 is configured to obtain face information of a first user. The sending module 1320 is configured to send the face information of the first user to a server. The receiving module 1330 is configured to receive mode information of the first user. The processing module 1340 is configured to configure, for the first user, video resources corresponding to the mode information. The mode information of the first user is obtained by the server from mode information of a plurality of users, and the mode information includes personalized settings information and video resource recommendation information.

Optionally, the personalized settings information includes at least one of signal source, volume, watch mode, watch category, watch duration, brightness, or sound effect.

Optionally, the processing module 1340 is configured to display a page corresponding to the signal source specified in the personalized settings information of the first user, where the page includes video resource recommended by the server and video resources that are presented in a form of cards and that correspond to the watch category specified for the first user.

Optionally, the processing module 1340 is configured to display a first face registration screen in response to an operation of creating an account by the first user, where the first face registration screen includes a first selection window and a second selection window, the first selection window is used for agreeing to register face information, and the second selection window is used for refusing to register face information. The obtaining module 1310 is configured to obtain the face information of the first user in response to an operation of agreeing to register face information by the first user.

Optionally, the processing module 1340 is configured to display a first basic settings screen, so that the first user performs personalized settings on the first basic settings screen to generate personalized settings information of the first user. The sending module 1320 is configured to send the face information of the first user and the personalized settings information of the first user to the server.

Optionally, the camera is built into the apparatus 1300.

Optionally, the camera is connected to the apparatus 1300 by a connection cable.

In an optional example, a person skilled in the art may understand that the apparatus 1300 may be specifically the first terminal device in the foregoing embodiments, or the functions of the control device in the foregoing embodiments may be integrated into the apparatus 1300, and the apparatus 1300 may be configured to execute each procedure and/or step corresponding to the first terminal device in the foregoing method embodiments. To avoid repetition, details are not repeated herein.

The foregoing apparatus 1300 has functions of implementing corresponding steps performed by the first terminal device in the foregoing methods. The functions may be implemented by hardware, or may be implemented by hardware executing corresponding software. The hardware or software includes one or more modules corresponding to the functions. For example, the sending module 1320 may be a communications interface, for example, a transceiver interface.

In this embodiment of this application, the apparatus 1300 in FIG. 13 may alternatively be a chip or a chip system, for example, a system on chip (system on chip, SoC). Correspondingly, the sending module 1320 may be a transceiver circuit of the chip, which is not limited herein.

Figure 14:
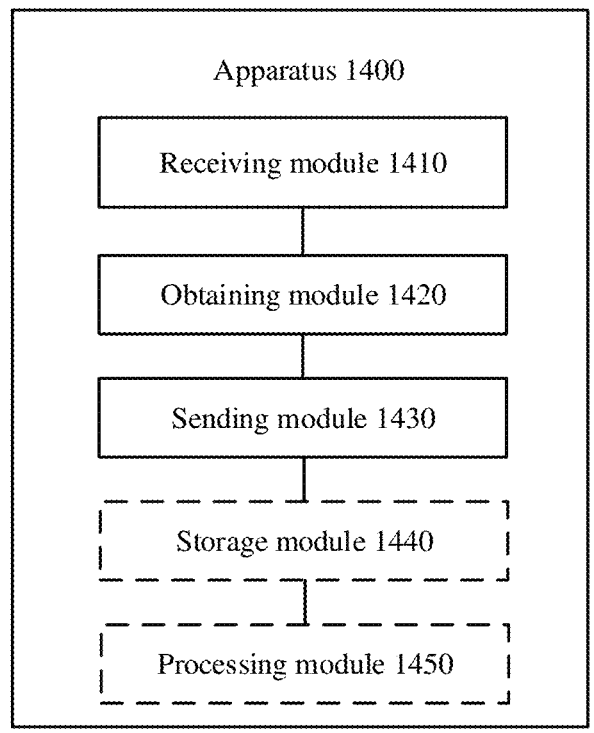
FIG. 14 is a schematic block diagram of another mode configuration apparatus according to an embodiment of this application.

FIG. 14 is a schematic block diagram of another mode configuration apparatus 1400 according to an embodiment of this application. The apparatus 1400 includes a receiving module 1410, an obtaining module 1420, and a sending module 1430.

The receiving module 1410 is configured to receive face information of a first user. The obtaining module 1420 is configured to obtain, based on the face information of the first user, mode information of the first user from mode information of a plurality of users, where the mode information includes personalized settings information and video resource recommendation information. The sending module 1430 is configured to send the mode information of the first user to a first terminal device.

Optionally, the personalized settings information includes at least one of signal source, volume, watch mode, watch category, watch duration, brightness, or sound effect.

Optionally, the receiving module 1410 is configured to receive the face information of the first user and the personalized settings information of the first user, where the face information of the first user and the personalized settings information of the first user are obtained through the second terminal device. The apparatus 1400 further includes a storage module 1440, configured to store the face information of the first user and the personalized settings information of the first user.

Optionally, the receiving module 1410 is configured to receive a watch history of the first user. The storage module 1440 is configured to store the watch history of the first user. The apparatus 1400 further includes the processing module 1450, configured to determine, based on the watch history of the first user, the video resource recommendation information and recommendation time period information of the first user.

Optionally, the watch history includes at least one of the face information, watch category, or watch time period of the first user.

Optionally, the receiving module 1410 is configured to receive watch histories of the plurality of users. The storage module 1440 is configured to store the watch histories of the plurality of users. The processing module 1450 is configured to classify the watch histories of the plurality of users to determine the video resource recommendation information and recommendation time period information of the first user.

Optionally, the processing module 1450 is configured to: classify, on a basis of "age group"-"time period"-"watch category", the watch histories of the plurality of users to determine a plurality of categories; determine, based on the face information of the first user, an age group to which the first user belongs; and determine, based on the age group to which the first user belongs and the plurality of categories, the video resource recommendation information and the recommendation time period information of the first user.

Optionally, the processing module 1450 is configured to: classify, on a basis of "gender"-"time period"-"watch category", the watch histories of the plurality of users to determine a plurality of categories; determine, based on the face information of the first user, a gender of the first user; and determine, based on the gender of the first user and the plurality of categories, the video resource recommendation information and the recommendation time period information of the first user.

In an optional example, a person skilled in the art may understand that the apparatus 1400 may be specifically the server in the foregoing embodiments, or the functions of the server in the foregoing embodiments may be integrated into the apparatus 1400, and the apparatus 1400 may be configured to execute each procedure and/or step corresponding to the server in the foregoing method embodiments. To avoid repetition, details are not repeated herein.

The foregoing apparatus 1400 has functions of implementing corresponding steps performed by the server in the foregoing methods. The functions may be implemented by hardware, or may be implemented by hardware executing corresponding software. The hardware or software includes one or more modules corresponding to the functions. For example, the sending module 1430 may be a communications interface, for example, a transceiver interface.

In this embodiment of this application, the apparatus 1400 in FIG. 14 may alternatively be a chip or a chip system, for example, a system on chip (system on chip, SoC). Correspondingly, the sending module 1430 may be a transceiver circuit of the chip, which is not limited herein.

Figure 15:
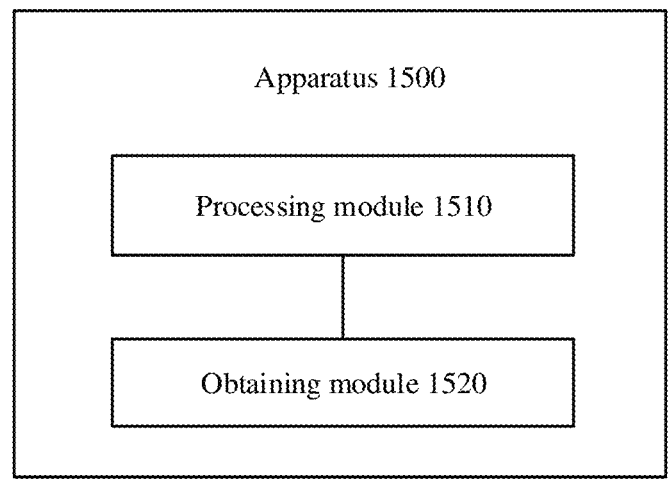
FIG. 15 is a schematic block diagram of still another mode configuration apparatus according to an embodiment of this application.

FIG. 15 is a schematic block diagram of still another mode configuration apparatus 1500 according to an embodiment of this application. The apparatus 1500 includes a processing module 1510 and an obtaining module 1520.

The processing module 1510 is configured to display a second face registration screen in response to an operation of creating an account by a first user, where the second face registration screen includes a third selection window and a fourth selection window, the third selection window is used for agreeing to register face information, and the fourth selection window is used for refusing to register face information. The obtaining module 1520 is configured to obtain the face information of the first user in response to an operation of agreeing to register face information by the first user.

Optionally, the processing module 1510 is configured to display a second basic settings screen, so that the first user performs personalized settings on the second basic settings screen to generate personalized settings information of the first user. The apparatus 1500 further includes a sending module 1530, configured to send the face information of the first user and the personalized settings information of the first user to a server.

In an optional example, a person skilled in the art may understand that the apparatus 1500 may be specifically the second terminal device in the foregoing embodiments, or the functions of the second terminal device in the foregoing embodiments may be integrated into the apparatus 1500, and the apparatus 1500 may be configured to execute each procedure and/or step corresponding to the second terminal device in the foregoing method embodiments. To avoid repetition, details are not repeated herein.

The foregoing apparatus 1500 has functions of implementing corresponding steps performed by the second terminal device in the foregoing methods. The functions may be implemented by hardware, or may be implemented by hardware executing corresponding software. The hardware or software includes one or more modules corresponding to the functions. In this embodiment of this application, the apparatus 1500 in FIG. 15 may alternatively be a chip or a chip system, for example, a system on chip (system on chip, SoC).

It should be understood that the apparatus 1300, apparatus 1400, and apparatus 1500 herein is embodied in a form of functional modules. The term "module" herein may be an application-specific integrated circuit (application-specific integrated circuit, ASIC), an electronic circuit, a processor (for example, a shared processor, a dedicated processor, or a set of processors) and a memory that execute one or more software programs or firmware programs, a combinational logic circuit, and/or other suitable components that support the described functions.

Figure 16:
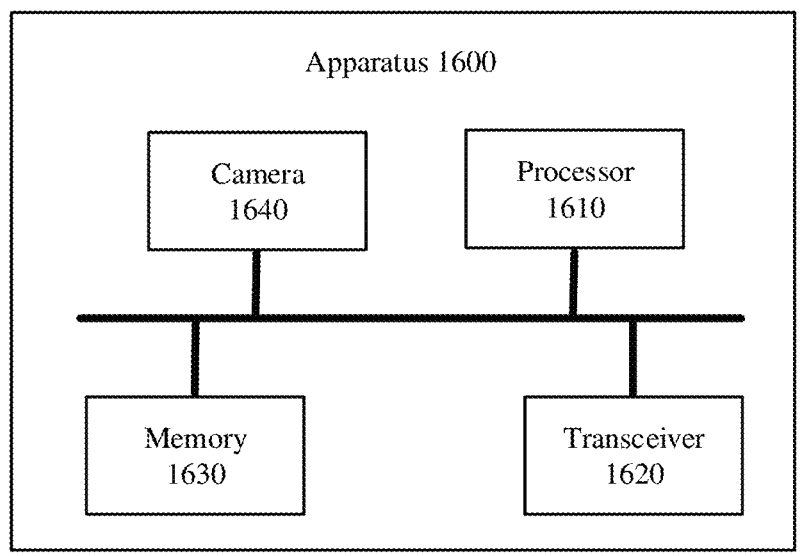
FIG. 16 is a schematic block diagram of a yet another mode configuration apparatus according to an embodiment of this application.

FIG. 16 is a schematic block diagram of a yet another mode configuration apparatus 1600 according to an embodiment of this application. The apparatus 1600 includes a processor 1610, a transceiver 1620, and a memory 1630. The processor 1610, the transceiver 1620, and the memory 1630 communicate with each other through internal connection paths. The memory 1630 is configured to store an instruction. The processor 1610 is configured to execute the instruction stored in the memory 1630, and control the transceiver 1620 to transmit and/or receive signals.

It should be understood that the apparatus 1600 may be specifically the first terminal device, the second terminal device, or the server in the foregoing embodiments, or the functions of the first terminal device, the second terminal device, or the server in the foregoing embodiments may be integrated into the apparatus 1600, and the apparatus 1600 may be configured to execute each procedure and/or step corresponding to the first terminal device, the second terminal device, or the server in the foregoing method embodiments.

When the apparatus 1600 is specifically the first terminal device in the foregoing embodiments, optionally, the apparatus 1600 includes a camera 1640 for obtaining face information of a user. In this case, the apparatus 1600 may execute each step and/or procedure corresponding to the first terminal device in the foregoing embodiments. Details are not repeated herein.

When the apparatus 1600 is specifically the server in the foregoing embodiments, the apparatus 1600 may include no camera 1640. In this case, the apparatus 1600 may execute each step and/or procedure corresponding to the server in the foregoing embodiments. Details are not repeated herein.

When the apparatus 1600 is specifically the second terminal device in the foregoing embodiments, optionally, the apparatus 1600 includes a camera 1640 for obtaining face information of a user. In this case, the apparatus 1600 may execute each step and/or procedure corresponding to the second terminal device in the foregoing embodiments. Details are not repeated herein.

Optionally, the memory 1630 may include a read-only memory and a random access memory, and provide an instruction and data to the processor. A part of the memory may further include a non-volatile random access memory. For example, the memory may further store information of a device type. The processor 1610 may be configured to execute the instruction stored in the memory. In addition, when the processor executes the instruction stored in the memory, the processor may execute each step and/or procedure corresponding to the information code serving device or service processing device in the foregoing method embodiments.

It should be understood that in this embodiment of this application, the processor may be a central processing unit (Central Processing Unit, CPU), or the processor may be another general-purpose processor, a digital signal processor (DSP), an application-specific integrated circuit (ASIC), a field-programmable gate array (FPGA) or other programmable logic devices, a discrete gate or transistor logic device, a discrete hardware component, or the like. The general-purpose processor may be a microprocessor, or the processor may also be any conventional processor or the like.

In an implementation process, steps in the foregoing methods can be implemented by using a hardware integrated logical circuit in the processor, or by using instructions in a form of software. The steps of the method disclosed with reference to the embodiments of this application may be directly performed by a hardware processor, or may be performed by using a combination of hardware in the processor and a software module. The software module may be located in a storage medium mature in the art, such as a random access memory, a flash memory, a read-only memory, a programmable read-only memory or electrically erasable programmable memory, or a register. The storage medium is located in the memory, and a processor executes instructions in the memory and completes the steps in the foregoing methods in combination with hardware of the processor. To avoid repetition, details are not repeated herein.

A person of ordinary skill in the art may realize that units and algorithm steps of various examples described with reference to the embodiments disclosed in this specification can be implemented by using electronic hardware or a combination of a computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by persons skilled in the art that, for the purpose of convenient and brief description, for a detailed working process of the foregoing system, apparatus, and unit, reference may be made to a corresponding process in the foregoing method embodiments, and details are not repeated here.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, function units in the embodiments of this application may be integrated into one processing unit, or each of the units may exist alone physically, or two or more units may be integrated into one unit.

When implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are only specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A mode configuration method, applied to an intelligent system comprising a first terminal device, a second terminal device, and a server, wherein the first terminal device is equipped with a first camera and the second terminal device is equipped with a second camera, and the method comprises:
   obtaining, by the first terminal device, face information of a first user by using the first camera, and sending the face information of the first user to the server;
   receiving, by the server, the face information of the first user, and obtaining, based on the face information of the first user, mode information of the first user from mode information of a plurality of users, wherein the mode information of the plurality of users comprises personalized settings information of the plurality of users and video resource recommendation information of the plurality of users;
   sending, by the server, the mode information of the first user to the first terminal device;
   receiving, by the first terminal device, the mode information of the first user, and configuring, for the first user, video resources corresponding to the mode information;
   displaying, by the second terminal device, a second face registration screen in response to an operation of creating an account by the first user, wherein the second face registration screen comprises a third selection window and a fourth selection window, the third selection window is used for agreeing to register face information, and the fourth selection window is used for refusing to register face information;
   obtaining, by the second terminal device by using the second camera of the second terminal device, the face information of the first user in response to an operation of agreeing to register face information by the first user;
   displaying, by the second terminal device, a second basic settings screen, wherein the first user performs personalized settings on the second basic settings screen to generate the personalized settings information of the first user;
   sending, by the second terminal device, the face information of the first user and the personalized settings information of the first user to the server; and
   receiving and storing, by the server, the face information of the first user and the personalized settings information of the first user.

2. The method according to claim 1, wherein the personalized settings information of the plurality of users comprises at least one of signal source, volume, watch mode, watch category, watch duration, brightness, or sound effect.

3. The method according to claim 1, wherein the receiving, by the first terminal device, the mode information of the first user, and configuring, for the first user, video resources corresponding to the mode information comprises:
   displaying, by the first terminal device, a page corresponding to a signal source specified in the personalized settings information of the first user, wherein the page comprises video resources recommended by the server and video resources that are presented in a form of cards and that correspond to the watch category specified for the first user.

4. The method according to claim 3, wherein the method further comprises:
   displaying, by the first terminal device, a first face registration screen in response to an operation of creating an account by the first user, wherein the first face registration screen comprises a first selection window and a second selection window, the first selection window is used for agreeing to register face information, and the second selection window is used for refusing to register face information; and
   obtaining, by the first terminal device by using the first camera, the face information of the first user in response to an operation of agreeing to register face information by the first user.

5. The method according to claim 4, wherein after the obtaining, by the first terminal device by using the first camera, the face information of the first user in response to an operation of agreeing to register face information by the first user, the method further comprises:
   displaying, by the first terminal device, a first basic settings screen, wherein the first user performs personalized settings on the first basic settings screen to generate the personalized settings information of the first user;
   sending, by the first terminal device, the face information of the first user and the personalized settings information of the first user to the server; and
   receiving and storing, by the server, the face information of the first user and the personalized settings information of the first user.

6. The method according to claim 5, wherein the first camera is built into the first terminal device.

7. The method according to claim 5, wherein the first camera is connected to the first terminal device by a connection cable.

8. The method according to claim 1, wherein the method further comprises:
   receiving and storing, by the server, a watch history of the first user; and determining, by the server based on the watch history of the first user, the video resource recommendation information and recommendation time period information of the first user.

9. The method according to claim 8, wherein the watch history comprises at least one of the face information, watch category, or watch time period of the first user.

10. The method according to claim 1, wherein the method further comprises:
receiving and storing, by the server, watch histories of a plurality of users; and
classifying, by the server, the watch histories of the plurality of users to determine the video resource recommendation information and recommendation time period information of the first user.

11. The method according to claim 10, wherein the classifying, by the server, the watch histories of the plurality of users to determine the video resource recommendation information and recommendation time period information of the first user comprises:
classifying, by the server on a basis of "age group"-"time period"-"watch category", the watch histories of the plurality of users to determine a plurality of categories;
determining, by the server based on the face information of the first user, an age group to which the first user belongs; and
determining, by the server based on the age group to which the first user belongs and the plurality of categories, the video resource recommendation information and the recommendation time period information of the first user.

12. The method according to claim 10, wherein the classifying, by the server, the watch histories of the plurality of users to determine the video resource recommendation information and recommendation time period information of the first user comprises:
classifying, by the server on a basis of "gender"-"time period"-"watch category", the watch histories of the plurality of users to determine a plurality of categories;
determining, by the server based on the face information of the first user, a gender of the first user; and
determining, by the server based on the gender of the first user and the plurality of categories, the video resource recommendation information and the recommendation time period information of the first user.

13. A mode configuration system comprising:
a first terminal device;
a second terminal device; and
a server;
wherein the second terminal device is configured to:
display a second face registration screen in response to an operation of creating an account by a first user, wherein the second face registration screen comprises a third selection window and a fourth selection window, the third selection window is used for agreeing to register face information, and the fourth selection window is used for refusing to register face information;
in response to an operation of agreeing to register face information by the first user, obtain face information of the first user by using a second camera of the second terminal device;
display a second basic settings screen, wherein the first user performs personalized settings on the second basic settings screen to generate personalized settings information of the first user; and
send the face information of the first user and the personalized settings information of the first user to the server;
wherein the server is configured to receive and store the face information of the first user and the personalized settings information of the first user;
wherein the first terminal device is configured to obtain face information of the first user by using a first camera of the first terminal device, and send the face information of the first user to the server;
wherein the server is configured to receive the face information of the first user, and obtain, based on the face information of the first user, mode information of the first user from mode information of a plurality of users, wherein the mode information comprises personalized settings information and video resource recommendation information;
wherein the server is configured to send the mode information of the first user to the first terminal device; and
wherein the first terminal device is configured to receive the mode information of the first user, and configure, for the first user, video resources corresponding to the mode information.

* * * * *